United States Patent
Akkarakaran et al.

(10) Patent No.: US 11,582,722 B2
(45) Date of Patent: Feb. 14, 2023

(54) SIDELINK BEAM CONFIGURATION AND INDICATION

(71) Applicant: QUALCOMM Incorporated, San Diego, CA (US)

(72) Inventors: Sony Akkarakaran, Poway, CA (US); Hua Wang, Basking Ridge, NJ (US); Jung Ho Ryu, Fort Lee, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 17/225,958

(22) Filed: Apr. 8, 2021

(65) Prior Publication Data

US 2021/0352625 A1 Nov. 11, 2021

Related U.S. Application Data

(60) Provisional application No. 63/020,977, filed on May 6, 2020.

(51) Int. Cl.
*H04W 56/00* (2009.01)
*H04W 72/02* (2009.01)
(Continued)

(52) U.S. Cl.
CPC .............. *H04W 72/02* (2013.01); *H04W 8/24* (2013.01); *H04W 72/0406* (2013.01);
(Continued)

(58) Field of Classification Search
CPC ....... H04W 72/02; H04W 76/27; H04W 8/24; H04W 72/0406; H04W 72/0446; H04W 72/046; H04W 80/02
(Continued)

(56) References Cited

U.S. PATENT DOCUMENTS

2020/0336253 A1* 10/2020 He ..................... H04W 4/40
2022/0140964 A1* 5/2022 Chen ................. H04L 5/0048
370/330

FOREIGN PATENT DOCUMENTS

WO 2020033088 A1 2/2020

OTHER PUBLICATIONS

HHI F., et al., "Design of Nr V2X Physical Layer Structures," 3GPP Draft, 3GPP TSG RAN WG1 #99, R1-1912287, 3rd Generation Partnership Project (3GPP), Mobile Competence Centre, 650, Route Des Lucioles, F-06921, Sophia-Antipolis Cedex, France, vol. RAN WG1, No. Reno, USA; Nov. 18, 2019-Nov. 22, 2019, Nov. 8, 2019 (Nov. 8, 2019), XP051819981, 11 pages, Retrieved from the Internet: URL: https://ftp.3gpp.org/tsg_ran/WG1_RL1/TSGR1_99/Docs/R1-1912287.zip R1-1912287_PhylayerStruct.docx [retrieved—on Nov. 8, 2019] the whole document.

(Continued)

*Primary Examiner* — Sai Ming Chan
(74) *Attorney, Agent, or Firm* — Loza & Loza LLP / Qualcomm

(57) ABSTRACT

Aspects relate to mechanisms for a wireless communication device to configure and indicate one or more beams for sidelink communication with another wireless communication device. The sidelink communication can include first stage sidelink control information (SCI) and second stage SCI that may be communicated on a first beam configured on the wireless communication devices. The sidelink communication can further include sidelink data traffic that may be communication on a second beam. The second beam may be the first beam or a different beam based on at least one of a beam capability of at least the first wireless communication device or a gap between the sidelink data traffic and at least one of the first stage SCI or the second stage SCI.

30 Claims, 15 Drawing Sheets

(51) Int. Cl.
- *H04W 72/04* (2023.01)
- *H04W 72/044* (2023.01)
- *H04W 76/27* (2018.01)
- *H04W 8/24* (2009.01)
- *H04W 80/02* (2009.01)
- *H04W 72/0446* (2023.01)

(52) U.S. Cl.
CPC ..... *H04W 72/046* (2013.01); *H04W 72/0446* (2013.01); *H04W 76/27* (2018.02); *H04W 80/02* (2013.01)

(58) Field of Classification Search
USPC ........................................................ 370/329
See application file for complete search history.

(56) References Cited

OTHER PUBLICATIONS

International Search Report and Written Opinion—PCT/US2021/026644—ISA/EPO—dated Jul. 21, 2021.

\* cited by examiner

SIDELINK BEAM CONFIGURATION AND INDICATION

CROSS-REFERENCE TO RELATED APPLICATIONS

The present Application for Patent claims priority to and the benefit of U.S. Provisional Application No. 63/020,977, filed May 6, 2020, and assigned to the assignee hereof and hereby expressly incorporated by reference herein as if fully set forth below in its entirety and for all applicable purposes.

TECHNICAL FIELD

The technology discussed below relates generally to wireless communication networks, and more particularly, to configuration and indication of beams for sidelink communication.

BACKGROUND

Wireless communication between devices may be facilitated by various network configurations. In one configuration, a cellular network may enable wireless communication devices (e.g., user equipment (UEs)) to communicate with one another through signaling with a nearby base station or cell. Another wireless communication network configuration is a device to device (D2D) network, in which wireless communication devices may signal one another directly, rather than via an intermediary base station or cell. For example, D2D communication networks may utilize sidelink signaling to facilitate the direct communication between wireless communication devices. In some sidelink network configurations, wireless communication devices may further communicate in a cellular network, generally under the control of a base station. Thus, the wireless communication devices may be configured for uplink and downlink signaling via a base station and further for sidelink signaling directly between the wireless communication devices without transmissions passing through the base station.

In wireless communication systems, such as those specified under standards for 5G New Radio (NR), both the base station and wireless communication devices may utilize beamforming to compensate for high path loss and short range. Beamforming is a signal processing technique used with an antenna array for directional signal transmission and/or reception. For example, an antenna in the antenna array can transmit a signal that is combined with other signals of other antennas of the same array in such a way that signals at particular angles experience constructive interference while others experience destructive interference. Beamforming may be implemented in both traditional cellular network configurations and sidelink network configurations on higher frequency bands to support increased data rates.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of sidelink wireless communication at a first wireless communication device is disclosed. The method includes communicating first stage sidelink control information (SCI) with a second wireless communication device on a first beam within a control region of a slot, and communicating second stage SCI with the second wireless communication device on the first beam within a data region of the slot. The method further includes communicating sidelink data traffic with the second wireless communication device on a second beam within the data region of the slot. The second beam may be the first beam or a different beam based on at least one of a beam capability of at least the first wireless communication device or a gap between the sidelink data traffic and at least one of the first stage SCI or the second stage SCI.

Another example provides a wireless communication device in a wireless communication network. The wireless communication device includes a wireless transceiver, a memory, and a processor communicatively coupled to the wireless transceiver and the memory. The processor and the memory may be configured to communicate first stage sidelink control information (SCI) with a second wireless communication device on a first beam within a control region of a slot, and communicate second stage SCI with the second wireless communication device on the first beam within a data region of the slot. The processor and the memory may be further configured to communicate sidelink data traffic with the second wireless communication device on a second beam within the data region of the slot. The second beam may be the first beam or a different beam based on at least one of a beam capability of at least the first wireless communication device or a gap between the sidelink data traffic and at least one of the first stage SCI or the second stage SCI.

Another example provides a wireless communication device in a wireless communication network. The wireless communication device includes means for communicating first stage sidelink control information (SCI) with a second wireless communication device on a first beam within a control region of a slot, and means for communicating second stage SCI with the second wireless communication device on the first beam within a data region of the slot. The wireless communication device further includes means for communicating sidelink data traffic with the second wireless communication device on a second beam within the data region of the slot. The second beam may be the first beam or a different beam based on at least one of a beam capability of at least the first wireless communication device or a gap between the sidelink data traffic and at least one of the first stage SCI or the second stage SCI.

Another example provides article of manufacture for use by a first wireless communication device in a wireless communication network. The article of manufacture includes a computer-readable medium having stored therein instructions executable by one or more processors of the first wireless communication device to communicate first stage sidelink control information (SCI) with a second wireless communication device on a first beam within a control region of a slot, and communicate second stage SCI with the second wireless communication device on the first beam within a data region of the slot. The computer-readable medium further includes instructions executable by the one or more processors of the first wireless communication device to communicate sidelink data traffic with the second wireless communication device on a second beam within the data region of the slot. The second beam may be the first beam or a different beam based on at least one of a beam capability of at least the first wireless communication device or a gap between the sidelink data traffic and at least one of the first stage SCI or the second stage SCI.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

DETAILED DESCRIPTION

Figure 1:
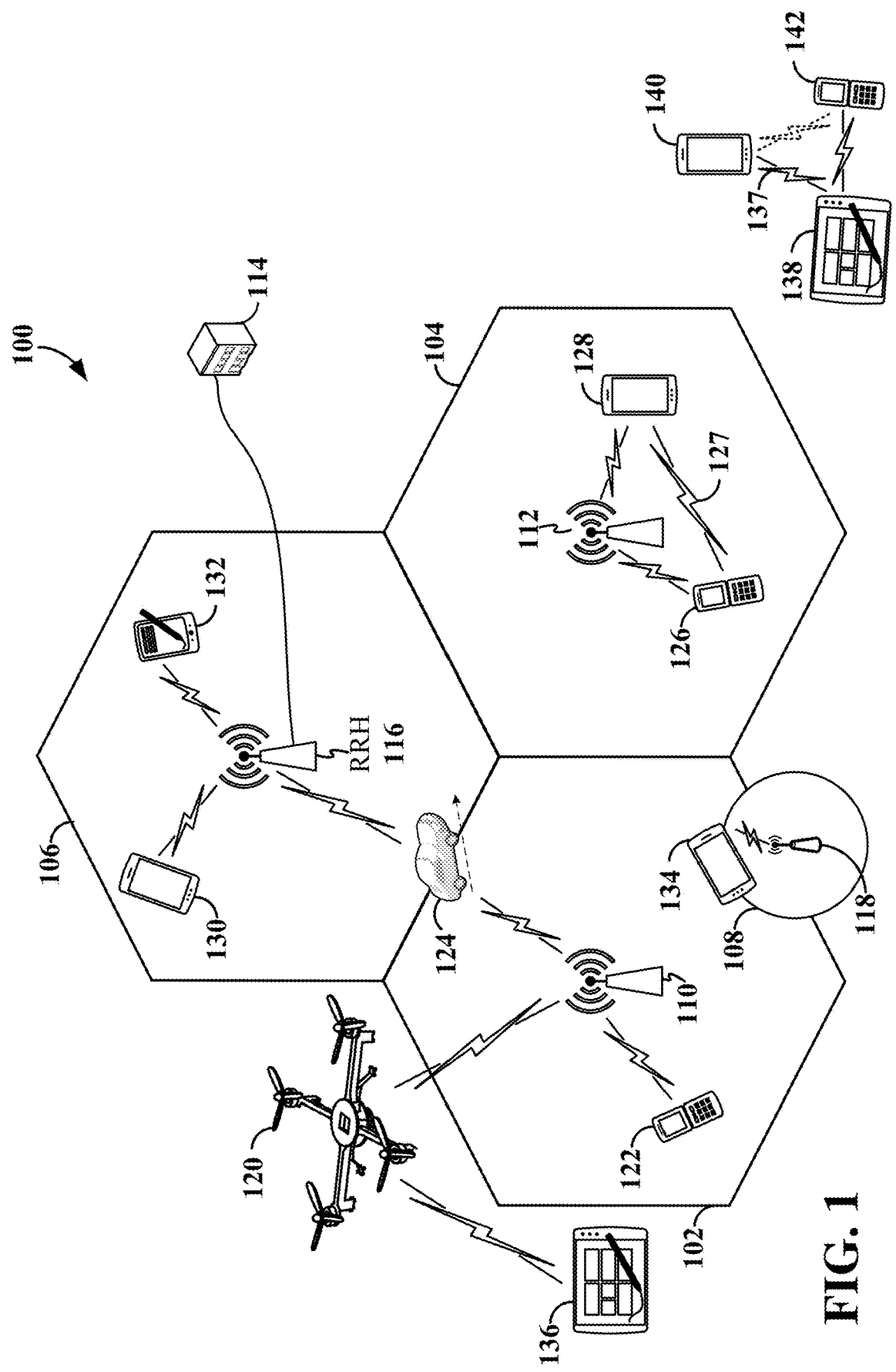
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

It should be understood that the above examples are not necessarily intended to limit claimed subject matter. For example, unless specifically recited, claimed subject matter relating to wireless communications is not necessarily intended to be limited to any particular author/entity defined frequency band, or the like.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, examples and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure relate to mechanisms for a wireless communication device to configure and indicate one or more beams for sidelink communication with another wireless communication device. The sidelink communication can include first stage sidelink control information (SCI) and second stage SCI that may be communicated on a first beam configured on the wireless communication devices. For example, the first beam may be configured based on a sidelink beam search and measurement procedure and/or may be updated via a sidelink medium access control (MAC) control element (MAC-CE), a radio access network (RAN) MAC-CE or a RAN radio resource control (RRC) message.

The sidelink communication can further include sidelink data traffic that may be communication on a second beam. The second beam may be the first beam or a different beam based on at least one of a beam capability of at least the first wireless communication device or a gap between the sidelink data traffic and at least one of the first stage SCI or the second stage SCI. For example, the sidelink data traffic may include a first portion that is frequency division multiplexed with the first stage SCI. The second beam utilized for communication of the first portion of the sidelink data traffic may be the first beam when the beam capability of at least the transmitting wireless communication device does not support simultaneous communication on multiple (e.g., two) beams. The second beam utilized for communication of the first portion of the sidelink data traffic may be a third beam (e.g., a different beam than the first beam) when the beam capability indicates that at least the transmitting wireless communication device supports multiple simultaneous beams. The second beam (e.g., the first beam or the third beam) utilized for the first portion of the sidelink data traffic may be configured on the wireless communication devices and/or updated, as indicated above.

The sidelink data traffic may further include a second portion that is time division multiplexed with the first stage SCI and the second stage SCI. The second beam utilized for communication of the second portion of the sidelink data traffic may be the first beam, the third beam, or a different beam than the first beam or the third beam. In examples in which the second beam utilized for communication of the second portion of the sidelink data traffic is the first beam or the third beam, the second beam may be configured on the wireless communication devices and/or updated, as indicated above. In examples in which the second beam utilized for communication of the second portion of the sidelink data traffic is a different beam, a beam identifier (ID) for the second beam may be included in at least one of the first stage SCI or the second stage SCI.

In some examples, the different beam is utilized for communication of the second portion of the sidelink data traffic when a length of the gap is greater than a threshold. In examples in which the beam ID is included in the first stage SCI, the gap may include the second stage SCI and/or a demodulation reference signal (DMRS) of the second portion of the sidelink data traffic. In examples in which the beam ID is included in the second stage SCI, the threshold may correspond to an extended gap length longer than an original gap length utilized for the threshold when the first stage SCI includes the beam ID. In some examples, the threshold may be configured based on a capability of the receiving wireless communication device. In some examples, the sidelink data traffic may include only the second portion (and not the first portion).

In some examples, the sidelink communication can further include feedback information corresponding to the sidelink data traffic. The feedback information may be communicated, for example, on a fourth beam. In some examples, the fourth beam may be the second beam utilized for at least the second portion of the sidelink data traffic. In some examples, the fourth beam may be a different beam or a default beam. The different beam or default beam may be utilized for the feedback information based on an additional gap (e.g., in number(s) of symbols) between at least one of the first stage SCI or second stage SCI and the feedback information. For example, the fourth beam utilized for communication of the feedback information may be the default beam when a length of the additional gap is less than or equal to an additional threshold. The default beam may be the second beam or another beam configured on the wireless communication devices. For example, the default beam may be configured based on a spatial relation indication and/or may be updated based on a sidelink MAC-CE, RAN MAC-CE, or RAN RRC message. The fourth beam utilized for communication of the feedback information may be the different beam when the length of the additional gap is greater than the threshold. In this example, the SCI-1 and/or SCI-2 may include a beam ID of the different beam.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time—frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Figure 2:
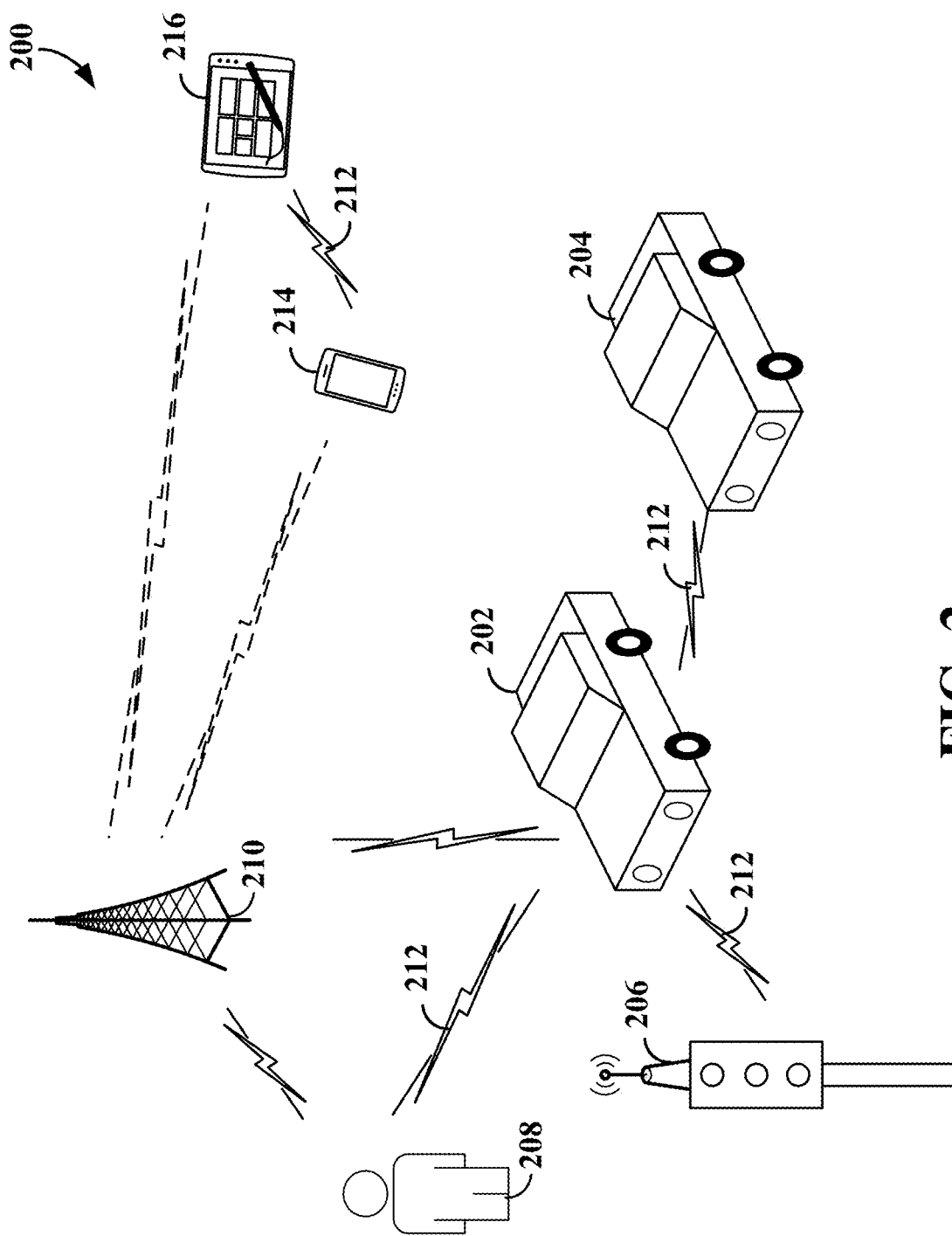
FIG. 2 is a diagram illustrating an example of a wireless communication network employing sidelink communication according to some aspects.

FIG. 2 illustrates an example of a wireless communication network 200 configured to support D2D or sidelink communication. In some examples, sidelink communication may include V2X communication. V2X communication involves the wireless exchange of information directly between not only vehicles (e.g., vehicles 202 and 204) themselves, but also directly between vehicles 202/204 and infrastructure (e.g., roadside units (RSUs) 206), such as streetlights, buildings, traffic cameras, tollbooths or other stationary objects, vehicles 202/204 and pedestrians 208, and vehicles 202/204 and wireless communication networks (e.g., base station 210). In some examples, V2X communication may be implemented in accordance with the New Radio (NR) cellular V2X standard defined by 2GPP, Release 16, or other suitable standard.

V2X communication enables vehicles 202 and 204 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicle-UEs (V-UEs) 202 and 204 or between a V-UE 202 or 204 and either an RSU 206 or a pedestrian-UE (P-UE) 208 may occur over a sidelink 212 utilizing a proximity service (ProSe) PC5 interface. In various aspects of the disclosure, the PC5 interface may further be utilized to support D2D sidelink 212 communication in other proximity use cases (e.g., other than V2X). Examples of other proximity use cases may include smart wearables, public safety, or commercial (e.g., entertainment, education, office, medical, and/ or interactive) based proximity services. In the example shown in FIG. 2, ProSe communication may further occur between UEs 214 and 216.

ProSe communication may support different operational scenarios, such as in-coverage, out-of-coverage, and partial coverage. Out-of-coverage refers to a scenario in which UEs (e.g., UEs 214 and 216) are outside of the coverage area of a base station (e.g., base station 210), but each are still configured for ProSe communication. Partial coverage refers to a scenario in which some of the UEs (e.g., V-UE 204) are outside of the coverage area of the base station 210, while other UEs (e.g., V-UE 202 and P-UE 208) are in communication with the base station 210. In-coverage refers to a scenario in which UEs (e.g., V-UE 202 and P-UE 208) are in communication with the base station 210 (e.g., gNB) via a Uu (e.g., cellular interface) connection to receive ProSe service authorization and provisioning information to support ProSe operations.

To facilitate D2D sidelink communication between, for example, UEs 214 and 216 over the sidelink 212, the UEs 214 and 216 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 212. For example, the discovery signal may be utilized by the UE 216 to measure the signal strength and channel status of a potential sidelink (e.g., sidelink 212) with another UE (e.g., UE 214). The UE 216 may utilize the measurement results to select a UE (e.g., UE 214) for sidelink communication or relay communication.

Figure 3:
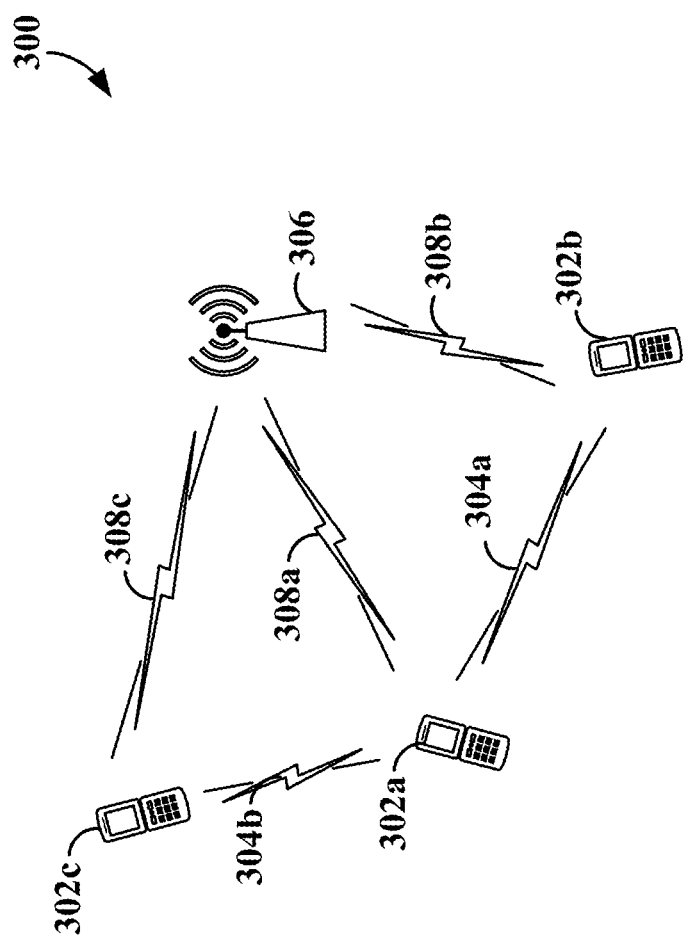
FIG. 3 is a diagram illustrating an example of a wireless communication network for facilitating both cellular and sidelink communication according to some aspects.

FIG. 3 is a diagram illustrating an example of a wireless communication network 300 for facilitating both cellular and sidelink communication. The wireless communication network 300 may correspond, for example, to the RAN 100 illustrated in FIG. 1. The wireless communication network 300 includes a plurality of wireless communication devices 302a, 302b, and 302c and a base station (e.g., eNB or gNB) 306. In some examples, the wireless communication devices 302a, 302b, and 302c may be UEs capable of implementing sidelink communication (e.g., V2X or D2D). For example, the wireless communication devices 302a, 302b, and 302c may be D2D devices in a D2D network or V2X devices (e.g., RSUs, V-UEs, P-UEs, etc.) within a V2X network.

The wireless communication devices 302a and 302b may communicate over a first sidelink 304a, while wireless communication devices 302a and 302c may communicate over a second sidelink 304b. Each of the sidelinks 304a and 304b may utilize, for example, a PC5 interface. Wireless communication devices 302a, 302b, and 302c may further communicate with the base station 306 over respective Uu links 308a, 308b, and 308c. The sidelink communication over the sidelinks 304a and 304b may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

In some examples, a common carrier may be shared between the sidelinks 304a and 304b and Uu links 308a-308c, such that resources on the common carrier may be allocated for both sidelink communication between wireless communication devices 302a-302c and cellular communication (e.g., uplink and downlink communication) between the wireless communication devices 302a-302c and the base station 306. For example, the wireless communication network 300 may be configured to support a Mode 1 sidelink network in which resources for both sidelink and cellular communication are scheduled by the base station 306. In other examples in which Mode 2 sidelink is implemented on the sidelinks 304a and 304b, the wireless communication devices 302a-302c may autonomously select sidelink resources (e.g., from one or more frequency bands or sub-bands designated for sidelink communication) for communication therebetween. In this example, the wireless communication devices 302a-302c may function as both scheduling entities and scheduled entities scheduling sidelink resources for communication with each other.

Figure 4:
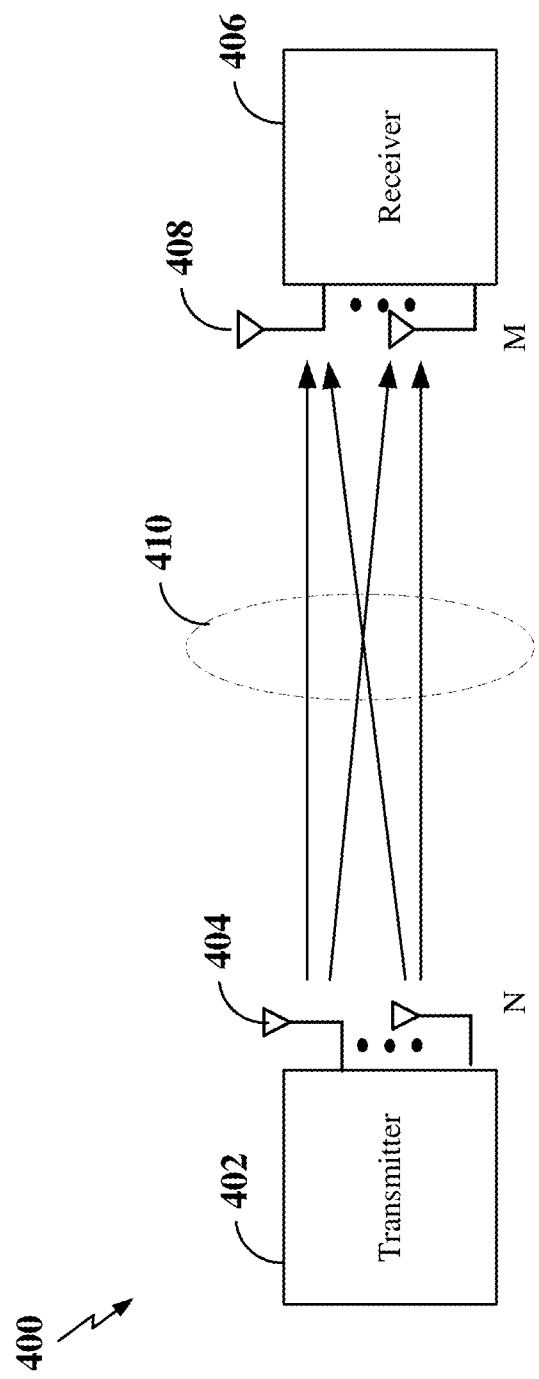
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable device. In some examples, the transmitter and receiver are each wireless communication devices (e.g., UEs or V2X devices) communicating over a sidelink channel.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit CSI-RSs with separate C-RS sequences for each layer to provide for multi-layer channel estimation. From the CSI-RS, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for FR2 (millimeter wave) systems, beamformed signals may be utilized for most downlink channels, including the physical downlink control channel (PDCCH) and physical downlink shared channel (PDSCH). In addition, broadcast control information, such as the synchronization signal block (SSB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). In addition, beamformed signals may further be utilized in D2D systems, such as NR SL or V2X, utilizing FR2.

Figure 5:
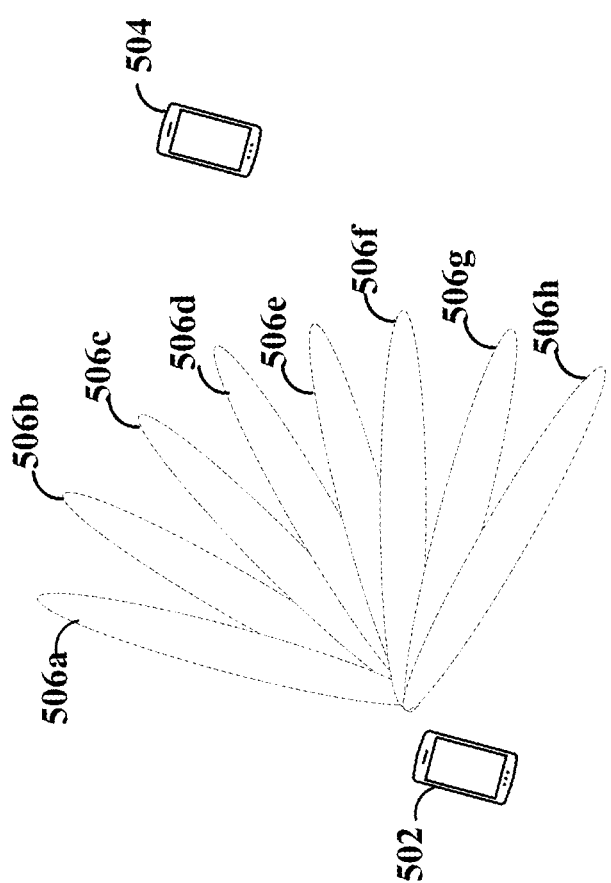
FIG. 5 is a diagram illustrating communication between a wireless communication devices using beamformed sidelink signals according to some aspects.

FIG. 5 is a diagram illustrating communication between a wireless communication devices 502 and 504 using beamformed sidelink signals according to some aspects. Each of the wireless communication devices 502 and 504 may be any of the UEs, V2X devices, transmitting devices or receiving devices illustrated in any of FIGS. 1-4.

In the example shown in FIG. 5, the wireless communication devices 502 and 504 may be configured to communicate sidelink signals on one or more of a plurality of beams 506a-506h. Although the beams 506a-506h are illustrated in FIG. 5 as being generated on wireless communication device 502, it should be understood that the same concepts described herein apply to beams generated on wireless communication device 504. For example, each wireless communication device 502 and 504 may select one or more beams to transmit sidelink signals to the other wireless communication device. In some examples, due to channel reciprocity, the selected beam(s) on each wireless communication device 502 and 504 may be used for both transmission and reception of sidelink signals. It should be noted that while some beams are illustrated as adjacent to one another, such an arrangement may be different in different aspects. In some examples, the wireless communication devices 502 and 504 may generate more or less beams distributed in different directions.

The number of beams on which a particular wireless communication device 502 or 504 may simultaneously communicate may be defined based on NR SL standards and specifications and capabilities of the wireless communication devices 502 and 504. For example, the number of beams may be determined based on a number of antenna panels configured on the wireless communication device 502 or 504. As an example, a wireless communication device 502 or 504 may include one or two antenna panels, and as such, may be configured to communicate on one or two beams, respectively, at a time. Each beam may be utilized to transmit a respective layer for MIMO communication. Other numbers of simultaneous beams are also possible in the present disclosure.

In some examples, to select one or more beams for communication on a sidelink between the two wireless communication devices 502 and 504, a first wireless communication device (e.g., wireless communication device 502) may transmit a sidelink reference signal, such as a sidelink synchronization signal block (SSB) or sidelink channel state information (CSI) reference signal (RS), on each of the plurality of beams 506a-506h in a beam-sweeping manner towards a second wireless communication device (e.g., wireless communication device 504). The second wireless communication device 504 searches for and identifies the beams based on the beam reference signals. The wireless communication device 502 then performs beam measurements (e.g., reference signal received power (RSRP), signal-to-interference-plus-noise ratio (SINR), reference signal received quality (RSRQ), etc.) on the beam reference signals to determine the respective beam quality of each of the beams.

The second wireless communication device 504 may then transmit a beam measurement report (e.g., a Layer 1 (L1) sidelink measurement report) to the first wireless communication device indicating the beam quality of one or more of the measured beams. The first wireless communication device or a radio access network (RAN) node (e.g., a base station, such as a gNB) may then select the particular beam(s) for communication between the first and second wireless communication devices on the sidelink based on the beam measurement report. For example, the first wireless communication device may forward the beam measurement report to the base station for selection of the beam(s). The base station may then signal the selected beam(s) via, for example, a radio resource control (RRC) message or via a medium access control (MAC) control element (CE).

Each selected beam on one of the wireless communication devices (e.g., wireless communication device 502) may form a beam pair link (BPL) with a corresponding selected beam on the other wireless communication device 504. Thus, each BPL includes corresponding transmit and receive beams on the wireless communication devices 502 and 504. For example, a BPL may include a first transmit/receive beam on the first wireless communication device 502 and a second transmit/receive beam on the second wireless communication device 504. To increase the data rate, multiple BPLs can be used to facilitate spatial multiplexing of multiple data streams. In some examples, the different BPLs can include beams from different antenna panels.

Various aspects of the present disclosure will be described with reference to an OFDM waveform, schematically illustrated in FIG. 6. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 6:
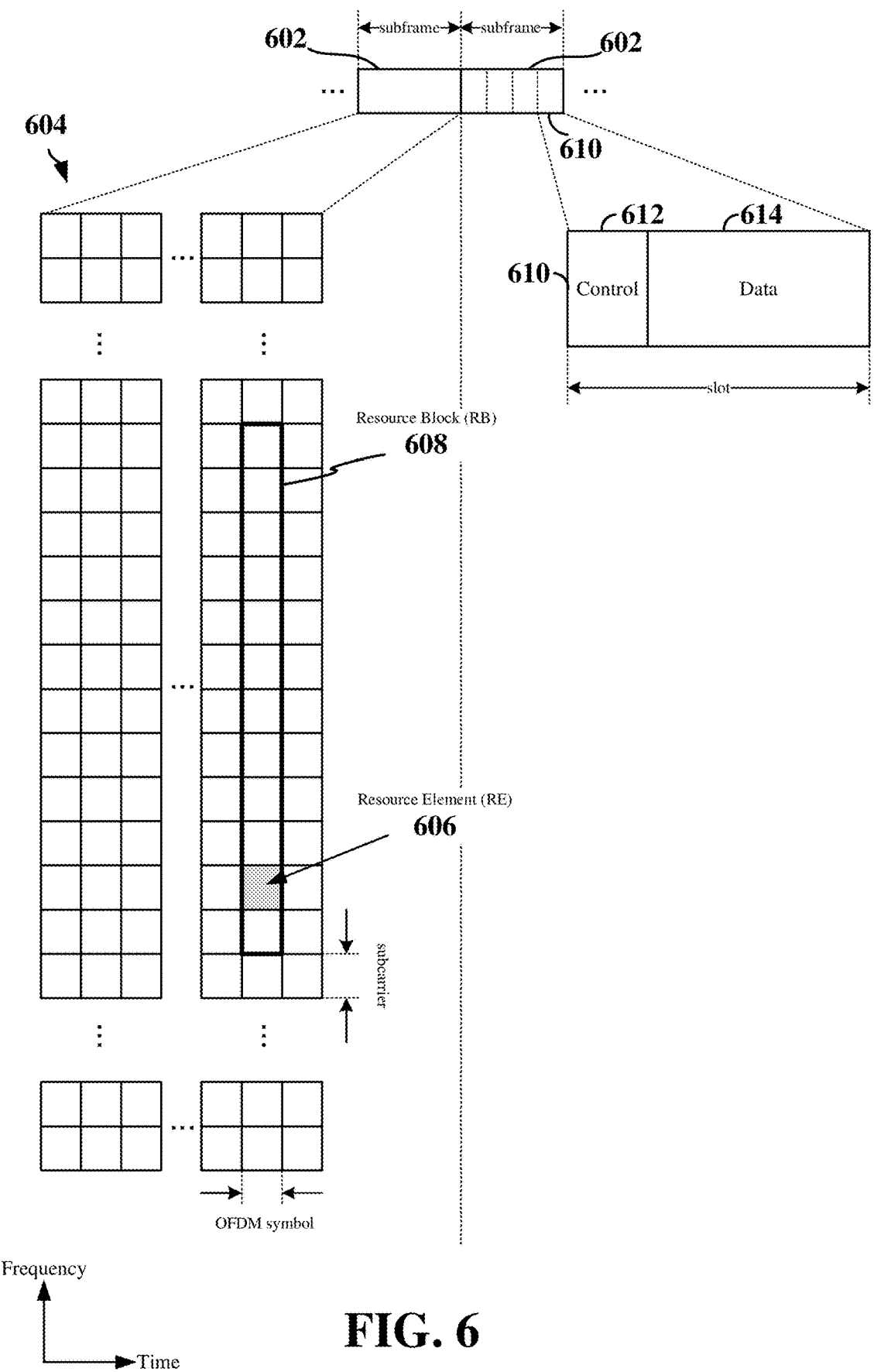
FIG. 6 is a diagram illustrating an example of a frame structure for use in a wireless communication network according to some aspects.

Referring now to FIG. 6, an expanded view of an exemplary subframe 602 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 604 may be used to schematically represent time—frequency resources for a given antenna port. That is, in a multiple-input-multiple-output (MIMO) implementation with multiple antenna ports available, a corresponding multiple number of resource grids 604 may be available for communication. The resource grid 604 is divided into multiple resource elements (REs) 606. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 608, which contains any suitable number of consecutive subcarriers in the frequency domain. In one example, an RB may include 16 subcarriers, a number independent of the numerology used. In some examples, depending on the numerology, an RB may include any suitable number of consecutive OFDM symbols in the time domain. Within the present disclosure, it is assumed that a single RB such as the RB 608 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 606 within one or more sub-bands or bandwidth parts (BWPs). Thus, a UE generally utilizes only a subset of the resource grid 604. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 608 is shown as occupying less than the entire bandwidth of the subframe 602, with some subcarriers illustrated above and below the RB 608. In a given implementation, the subframe 602 may have a bandwidth corresponding to any number of one or more RBs 608. Further, in this illustration, the RB 608 is shown as occupying less than the entire duration of the subframe 602, although this is merely one possible example.

Each 1 ms subframe 602 may consist of one or multiple adjacent slots. In the example shown in FIG. 6, one subframe 602 includes four slots 610, as an illustrative example. In some examples, a slot may be defined according to a specified number of OFDM symbols with a given cyclic prefix (CP) length. For example, a slot may include 7 or 16 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 610 illustrates the slot 610 including a control region 616 and a data region 614. In general, the control region 616 may carry control channels, and the data region 614 may carry data channels. Of course, a slot may contain all DL, all UL, or at least one DL portion and at least one UL portion. The structure illustrated in FIG. 6 is merely exemplary in nature, and different slot structures may be utilized, and may include one or more of each of the control region(s) and data region(s).

Although not illustrated in FIG. 6, the various REs 606 within a RB 608 may be scheduled to carry one or more physical channels, including control channels, shared channels, data channels, etc. Other REs 606 within the RB 608 may also carry pilots or reference signals. These pilots or reference signals may provide for a receiving device to perform channel estimation of the corresponding channel, which may enable coherent demodulation/detection of the control and/or data channels within the RB 608.

In some examples, the slot 610 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 606 (e.g., within the control region 616) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 606 (e.g., in the control region 616 or the data region 614) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 606 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 606 (e.g., within the data region 614) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 606 within the data region 614 may be configured to carry other signals, such as one or more SIBs and DMRSs.

In an example of sidelink communication over a sidelink carrier via a PC5 interface, the control region 616 of the slot 610 may include a physical sidelink control channel (PSCCH) including sidelink control information (SCI) transmitted by an initiating (transmitting) sidelink device (e.g., Tx V6X device or other Tx UE) towards a set of one or more other receiving sidelink devices (e.g., Rx V6X device or other Rx UE). The data region 614 of the slot 610 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 606 within slot 610. For example, HARQ feedback information may be transmitted in a physical sidelink feedback channel (PSFCH) within the slot 610 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 610.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 6 are not necessarily all of the channels or carriers that may be utilized between devices, and those of ordinary skill in the art will recognize that other channels or carriers may be utilized in addition to those illustrated, such as other traffic, control, and feedback channels.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. The base station 310 may further activate preconfigured sidelink grants (e.g., configured grants) for sidelink communication among the sidelink devices. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

Figure 7A:
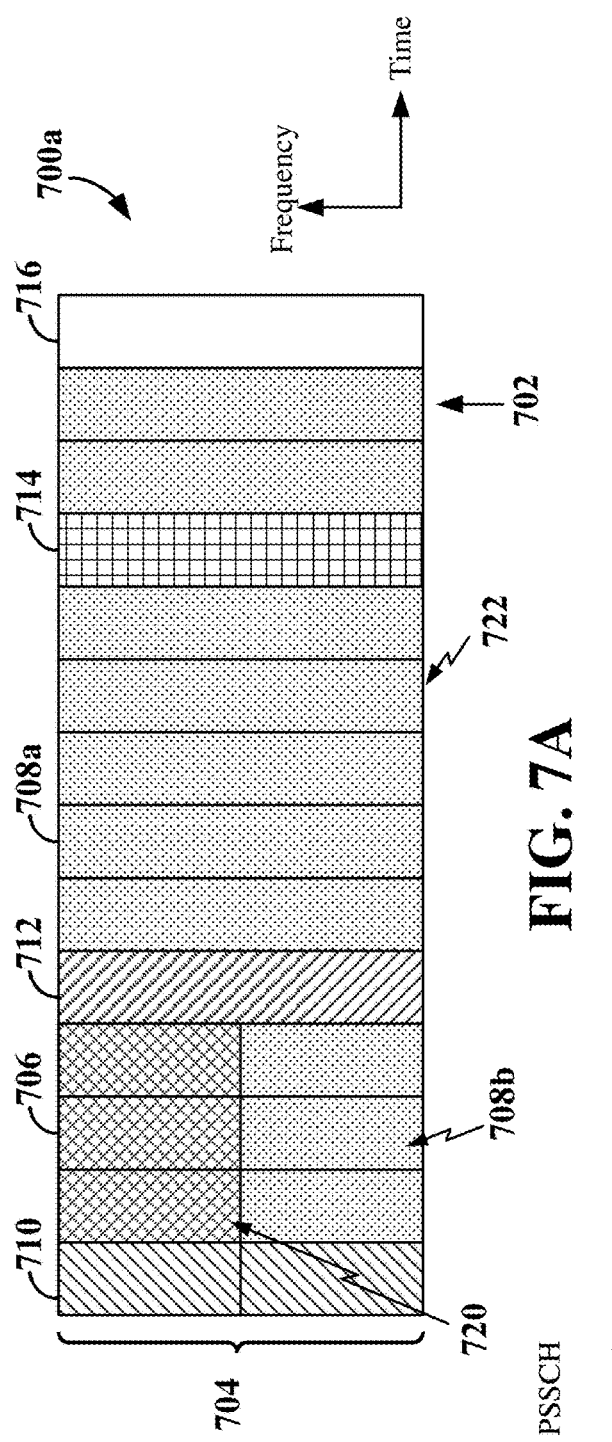
FIGS. 7A-7C illustrate examples of sidelink slot structures according to some aspects.
Figure 7B:
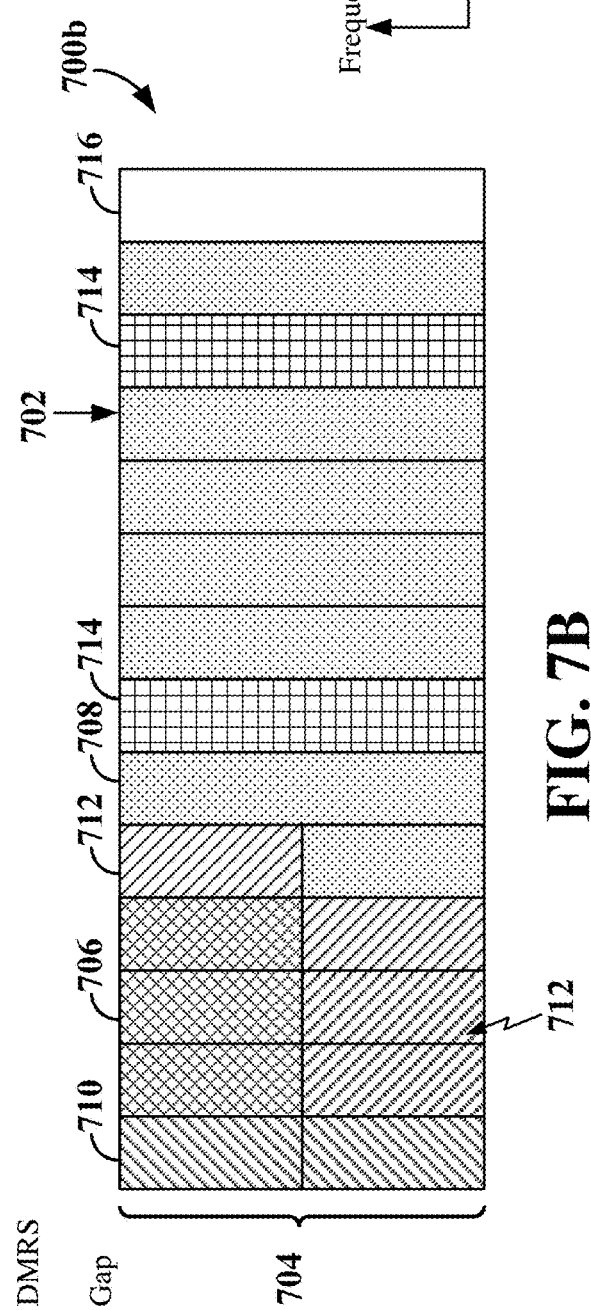
Figure 7C:
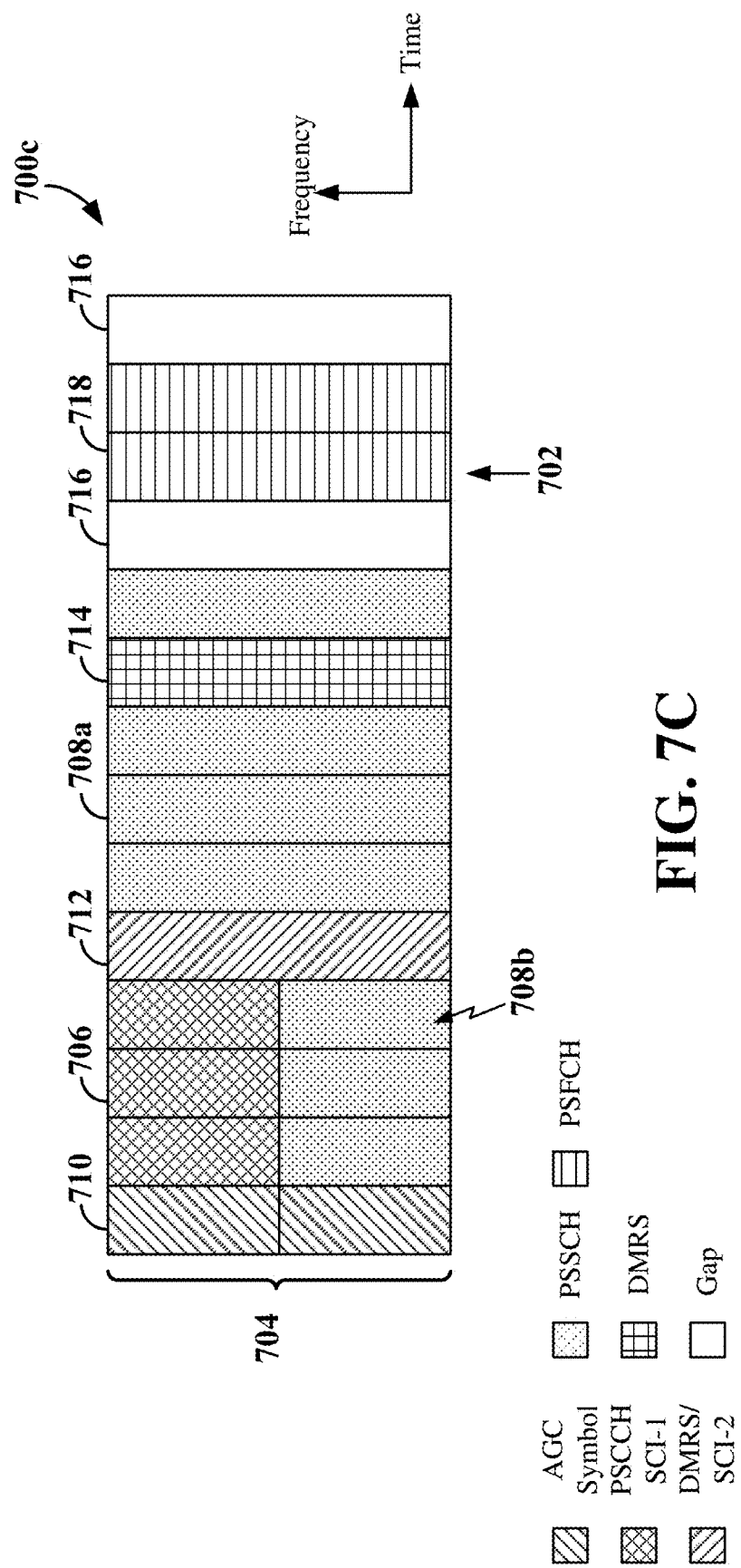

FIGS. 7A-7C are diagrams illustrating examples of sidelink slot structures according to some aspects. The sidelink slot structures may be utilized, for example, in a V2X or other D2D network implementing sidelink. In the examples shown in FIGS. 7A-7C, time is in the horizontal direction with units of symbols 702 (e.g., OFDM symbols); and frequency is in the vertical direction. Here, a carrier bandwidth 704 allocated for sidelink wireless communication is illustrated along the frequency axis. The carrier bandwidth 704 may include a plurality of sub-channels, where each sub-channel may include a configurable number of PRBs (e.g., 10, 17, 20, 27, 70, 77, or 100 PRBs).

Each of FIGS. 7A-7C illustrate an example of a respective slot 700*a*-700*c* including fourteen symbols 702 that may be used for sidelink communication. However, it should be understood that sidelink communication can be configured to occupy fewer than fourteen symbols in a slot 700*a*-700*c*, and the disclosure is not limited to any particular number of symbols 702. Each sidelink slot 700*a*-700*c* includes a physical sidelink control channel (PSCCH) 706 occupying a control region 720 of the slot 700*a*-700*c* and a physical sidelink shared channel (PSSCH) 708 occupying a data region 722 of the slot 700*a*-700*c*. The PSCCH 706 and PSSCH 708 are each transmitted on one or more symbols 702 of the slot 700*a*-700*c*. The PSCCH 706 includes, for example, SCI-1 that schedules transmission of data traffic on time-frequency resources of the corresponding PSSCH 708. As shown in FIGS. 7A-7C, the PSCCH 706 and corresponding PSSCH 708 are transmitted in the same slot 700*a*-700*c*. In other examples, the PSCCH 706 may schedule a PSSCH in a subsequent slot.

In some examples, the PSCCH 706 duration is configured to be two or three symbols. In addition, the PSCCH 706 may be configured to span a configurable number of PRBs, limited to a single sub-channel. For example, the PSCCH 706 may span 10, 12, 17, 20, or 27 PRBs of a single sub-channel. A DMRS may further be present in every PSCCH symbol. In some examples, the DMRS may be placed on every fourth RE of the PSCCH 706. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 7A-7C, the starting symbol for the PSCCH 706 is the second symbol of the corresponding slot 700*a*-700*c* and the PSCCH 706 spans three symbols 702.

The PSSCH 708 may be time-division multiplexed (TDMed) with the PSCCH 706 and/or frequency-division multiplexed (FDMed) with the PSCCH 706. In the examples shown in FIGS. 7A and 7C, the PSSCH 708 includes a first portion 708*a* that is TDMed with the PSCCH 706 and a second portion 708*b* that is FDMed with the PSCCH 706. In the example shown in FIG. 7B, the PSSCH 708 is TDMed with the PSCCH 706.

One and two layer transmissions of the PSSCH 708 may be supported with various modulation orders (e.g., QPSK, 16-QAM, 67-QAM and 276-QAM). In addition, the PSSCH 708 may include DMRSs 714 configured in a two, three, or four symbol DMRS pattern. For example, slots 700*a* and 700*c* shown in FIGS. 7A and 7C illustrate a two symbol DMRS pattern, while slot 700*b* shown in FIG. 7B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 708 symbols in the slot 700*a*-700*c*. In addition, a gap symbol 716 is present after the PSSCH 708 in each slot 700*a*-700*c*.

Each slot 700*a*-700*c* further includes SCI-2 712 mapped to contiguous RBs in the PSSCH 708 starting from the first symbol containing a PSSCH DMRS. In the examples shown in FIGS. 7A and 7C, the first symbol containing a PSSCH DMRS is the fifth symbol occurring immediately after the last symbol carrying the PSCCH 706. Therefore, the SCI-2 712 is mapped to RBs within the fifth symbol. In the example shown in FIG. 7B, the first symbol containing a PSSCH DMRS is the second symbol, which also includes the PSCCH 706. In addition, the SCI-2/PSSCH DMRS 712 are shown spanning symbols two through five. As a result, the SCI-2/PSSCH DMRS 712 may be FDMed with the PSCCH 706 in symbols two through four and TDMed with the PSCCH 706 in symbol five.

The SCI-2 may be scrambled separately from the sidelink shared channel. In addition, the SCI-2 may utilize QPSK.

When the PSSCH transmission spans two layers, the SCI-2 modulation symbols may be copied on (e.g., repeated on) both layers. The SCI-1 in the PSCCH 706 may be blind decoded at the receiving wireless communication device. However, since the format, starting location, and number of REs of the SCI-2 712 may be derived from the SCI-1, blind decoding of SCI-2 is not needed at the receiver (receiving UE).

In each of FIGS. 7A-7C, the second symbol of each slot 700a-700c is copied onto (repeated on) a first symbol 710 thereof for automatic gain control (AGC) settling. For example, in each of FIGS. 7A and 7C, the second symbol containing the PSCCH 706 FDMed with the PSSCH 708b may be transmitted on both the first symbol and the second symbol. In the example shown in FIG. 7B, the second symbol containing the PSCCH 706 FDMed with the SCI-2/PSSCH DMRS 712 may be transmitted on both the first symbol and the second symbol.

As shown in FIG. 7C, HARQ feedback may be transmitted on a physical sidelink feedback channel (PSFCH) 718 in a configurable resource period of 0, 1, 2, or 4 slots. In sidelink slots (e.g., slot 700c) containing the PSFCH 718, one symbol 702 may be allocated to the PSFCH 718, and the PSFCH 718 may be copied onto (repeated on) a previous symbol for AGC settling. In the example shown in FIG. 7C, the PSFCH 718 is transmitted on the thirteenth symbol and copied onto the twelfth symbol in the slot 700c. A gap symbol 716 may further be placed after the PSFCH symbols 718.

In some examples, there is a mapping between the PSSCH 708 and the corresponding PSFCH resource. The mapping may be based on, for example, the starting sub-channel of the PSSCH 708, the slot containing the PSSCH 708, the source ID and the destination ID. In addition, the PSFCH can be enabled for unicast and groupcast communication. For unicast, the PSFCH may include one ACK/NACK bit. For groupcast, there may be two feedback modes for the PSFCH. In a first groupcast PSFCH mode, the receiving UE transmits only NACK, whereas in a second groupcast PSFCH mode, the receiving UE may transmit either ACK or NACK. The number of available PSFCH resources may be equal to or greater than the number of UEs in the second groupcast PSFCH mode.

For FR2 sidelink operation, the SCI-1 (PSCCH 706), SCI-2 (SCI-2/PSSCH DMRS 712), and sidelink data traffic (PSSCH 708) may each be transmitted on a selected beam. In some examples, the SCI-1, SCI-2, and sidelink data traffic may each be transmitted on the same beam. In other examples, one or more of the SCI-1, SCI-2, and sidelink data traffic may be transmitted on different beams. In addition, feedback information (PSFCH 718) corresponding to the sidelink data traffic may further be received on the same or a different beam than the sidelink data traffic. Various aspects of the present disclosure relate to configuration and indication of the selected beam(s) for transmitting the SCI-1, SCI-2, data traffic, and feedback information.

In sidelink networks, beam selection may be performed by the base station or wireless communication devices based on beams identified through a sidelink beam search and measurement procedure, as described above in connection with FIG. 5. For example, the receiving wireless communication device may identify and measure a plurality of beams of a transmitting wireless communication device. The receiving wireless communication device may then generate and transmit a beam measurement report to the transmitting wireless communication device indicating the beam quality (e.g., RSRP, SINR, or RSRQ) of one or more of the measured beams. The transmitting wireless communication device may either select one or more beams for communication with the receiving wireless communication device based on the beam measurement report or forward the beam measurement report to a serving base station (or RAN) for selection of the beam(s).

In an aspect of the disclosure, the beam selected for transmission of the PSCCH including SCI-1 706 and SCI-2 712 may be configured on the transmitting and receiving wireless communication devices. In some examples, the selected SCI-1/SCI-2 beam may be configured based on the beam search and measurement procedure. For example, the selected SCI-1/SCI-2 beam may have a highest beam quality indicated in the beam measurement report. In some examples, the SCI-1/SCI-2 beam may be updated using various mechanisms. For example, the selected SCI-1/SCI-2 beam may be updated by the base station or RAN using a RAN RRC message or a RAN medium access control (MAC) control element (MAC-CE). As another example, the selected SCI-1/SCI-2 beam may be updated via a sidelink MAC-CE. In this example, the sidelink MAC-CE may be sent from the receiving wireless communication device to the transmitting wireless communication device.

The beam selected for transmission of the PSSCH 708 may be the same as the beam selected for the PSCCH 706/712 or may be a different beam. In some examples, for the PSSCH portion 708b FDMed with the PSCCH 706, there is not time for the receiving wireless communication device to decode the PSCCH 706 and direct a receive beam according to a selected transmit beam indicated in the PSCCH 706 (e.g., based on the BPL with the selected transmit beam) to receive the FDMed portion of the PSSCH 708b. Therefore, the selected beam for the FDMed PSSCH portion 708b may be the same beam utilized for the PSCCH 706. However, if the transmitting wireless communication device or both the transmitting and receiving wireless communication devices are capable of simultaneously communicating on more than one beam, the selected beam for the FDMed portion of the PSSCH 708b may be different than the beam used for the PSCCH 706. In this example, the selected beam for the FDMed portion of the PSSCH 708b may be configured on the transmitting and receiving wireless communication devices (e.g., based on the beam measurement report) and may be updated via sidelink MAC-CE, RAN RRC signaling or a RAN MAC-CE. In some examples, the selected beam for the PSCCH 706 may be the beam having a highest beam quality associated with a first antenna panel of the transmitting wireless communication device and the selected beam for the FDMed portion of the PSSCH 708b may be the beam having a highest beam quality associated with a second antenna panel of the transmitting wireless communication device.

In some examples, for the PSSCH portion 708a that is TDMed with the PSCCH 706, the selected beam may be the same beam utilized for the PSCCH 706. In other examples, the selected beam for the TDMed PSSCH portion 708a may be the same beam utilized for the FDMed PSSCH portion 708b when at least the transmitting wireless communication device supports multiple simultaneous beams and the FDMed PSSCH portion 708b utilizes a different beam than the PSCCH portion 706.

In some examples, when there is time to decode the PSCCH 706 and form the beam indicated in the PSCCH 706, the selected beam for the TDMed PSSCH portion 708a may be included in the PSCCH 706. In this example, at least one of the SCI-1 706 or SCI-2 712 may include a beam identifier identifying the selected beam for the TDMed PSSCH portion 708a. The beam identifier may correspond, for example, to a transmission configuration indicator (TCI) state indicating the spatial property (e.g., beam direction and/or beam width) of the receive beam to be utilized by the receiving wireless communication device. For example, the TCI state may include quasi co-location (QCL) information (e.g., QCL-Type D) referencing a sidelink SSB beam or sidelink CSI-RS transmit beam on the transmitting wireless communication device. From the QCL-Type D information, the receiving wireless communication device may identify the selected receive beam (e.g., based on the BPL with the indicated transmit beam).

The transmitting wireless communication device may determine whether there is sufficient time for the receiving wireless communication device to decode and form the selected beam based on a gap between the sidelink data traffic and at least one of the SCI-1 706 or the SCI-2 712. For example, the transmitting wireless communication device may compare a length of the gap to a threshold. When the gap is greater than the threshold, the transmitting wireless communication device may include the beam identifier of the TDMed PSSCH portion 708a in SCI-1 and/or SCI-2. When the length of the gap is less than or equal to the threshold, the selected beam for the TDMed PSSCH portion 708a may be the same as the beam utilized for the PSCCH 706 or the beam utilized for the FDMed PSSCH portion 708b (if different than the PSCCH beam).

In some examples, the threshold may correspond to a number of symbols 702. For example, the threshold may include one or more symbols 702 and may be configured based on the capability of the receiving wireless communication device. In examples in which the selected beam for the TDMed PSSCH portion 708a is included in SCI-1 706, the gap is measured from the first symbol after the SCI-1 706, and as such, may include symbols containing DMRS/SCI-2 712 or DMRS 714. In examples in which the selected beam for the TDMed PSSCH portion 708a is included in SCI-2 712 or both SCI-1 706 and SCI-2 712, the gap is measured from the first symbol after SCI-2 712. In addition, the threshold may be larger when the beam identifier is included in SCI-2 712 to allow more time for the receiving wireless communication device to decode both SCI-1706 and SCI-2 712. For example, when SCI-2 712 includes the beam identifier, the threshold may correspond to an extended gap length that is longer than an original gap length utilized when SCI-1 706 includes the beam identifier.

The PSFCH 718 may further be communicated on a selected beam. In some examples, the selected beam for the PSFCH 718 may be configured on the transmitting and receiving wireless communication devices. For example, the PSFCH transmit beam may be configured based on a spatial relation indication (e.g., a TCI state indicating a spatial property of the selected transmit beam on the receiving wireless communication device). For example, the spatial relation indication pre-configured on the receiving wireless communication device may indicate that the PSFCH transmit beam is the same as the receive beam utilized by the receiving wireless communication device to receive the PSSCH 708. The selected PSFCH beam may further be updated via sidelink MAC-CE, RAN RRC signaling, or a RAN MAC-CE.

In some examples, when there is time to decode the PSCCH 706 and form the beam indicated in the PSCCH 706, the selected beam for the PSFCH 718 may be included in the PSCCH 706. In this example, at least one of the SCI-1 706 or SCI-2 712 may include a beam identifier (e.g., a spatial relation indication) identifying the selected transmit beam for the PSFCH 718. In some examples, the transmitting wireless communication device may include the beam identifier for the PSFCH 718 in SCI-1 706 and/or SCI-2 712 when an additional gap between the PSFCH 718 and the last SCI (e.g., SCI-1 706 or SCI-2 712) carrying the beam identifier is greater than a threshold. The threshold used for the PSFCH 718 may be the same or different than the threshold used for the TDMed PSSCH 708a. For example, the threshold may include one or more symbols and may be configured based on the capability of the receiving wireless communication device. When the length of the additional gap is less than or equal to the threshold, the selected beam for the PSFCH 718 may be a default beam. In some examples, the default beam may be the pre-configured beam (e.g., the same beam as that used for receiving the PSSCH 708 or the updated pre-configured beam).

Figure 8:
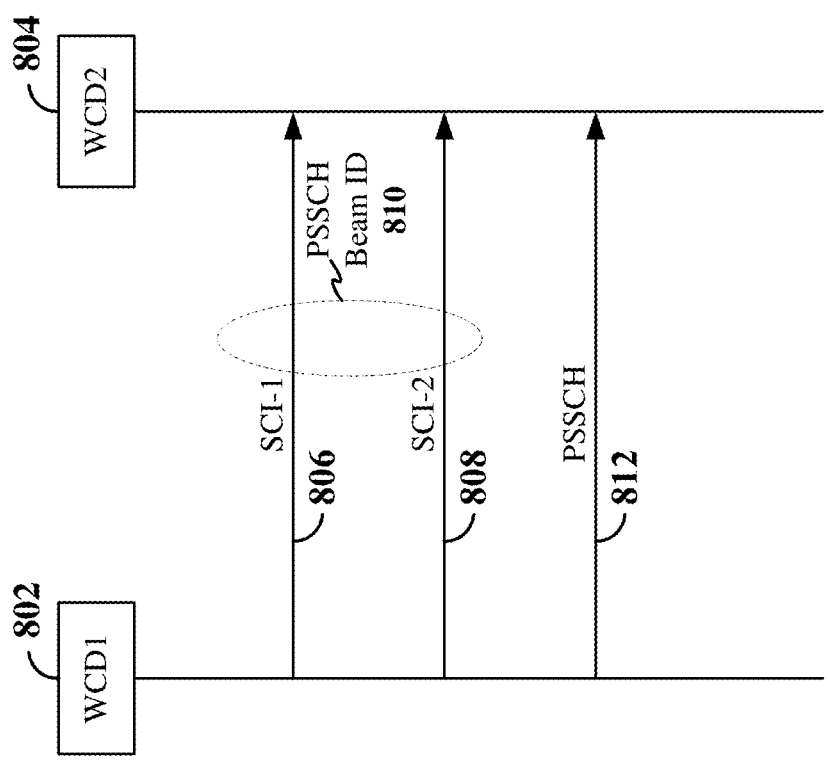
FIG. 8 is a signaling diagram illustrating an example of sidelink beam indication according to some aspects.

FIG. 8 is a signaling diagram illustrating an example of sidelink beam indication according to some aspects. In the example shown in FIG. 8, a first wireless communication device (WCD1) 802 is in wireless communication with a second wireless communication device (WCD2) 804 over a sidelink channel. Each of WCD1 802 and WCD2 804 may correspond to any of the scheduled entities, UEs, V2X devices, or D2D devices shown in FIGS. 1-5.

At 806, the WCD1 802, which may be a transmitting wireless communication device, transmits SCI-1 to WCD2 804. The SCI-1 may include, for example, a resource allocation on a sidelink carrier for sidelink data traffic (PSSCH) and second stage SCI (SCI-2). At 808, the WCD1 802 transmits the SCI-2 to the WCD2 804. The SCI-2 may contain further information related to the sidelink data traffic. The SCI-1 may be transmitted, for example, within a PSCCH, whereas SCI-2 may be transmitted within the PSSCH.

Each of the SCI-1 and SCI-2 may further be transmitted on a same beam, which may be configured, for example, based on a beam search and measurement procedure and/or updated via RAN RRC signaling, a RAN MAC-CE, or a sidelink MAC-CE. In addition, at least one of the SCI-1 or the SCI-2 may include a PSSCH beam identifier (ID) 810 identifying a selected beam for the sidelink data traffic. For example, the PSSCH beam ID may indicate the selected beam for the portion of the PSSCH that is TDMed with the PSCCH. The PSSCH beam ID 810 may include, for example, a TCI state indicator that indicates a spatial property of the beam. In some examples, the SCI-1 and/or SCI-2 includes the PSSCH beam ID when a length of a gap (e.g., in numbers of symbols) between a last SCI (e.g., SCI-1 or SCI-2) carrying the PSSCH beam ID and the sidelink data traffic is greater than a threshold. For example, the threshold may be equal to one or more symbols of the slot including the PSCCH and PSSCH.

At 812, the WCD1 802 transmits the PSSCH carrying the sidelink data traffic to the WCD2 804 on the selected beam indicated by the PSSCH beam ID 810. In some examples, the SCI-1 and SCI-2 may be transmitted on a first beam and the sidelink data traffic may be transmitted on a second beam that is different than the first beam. In some examples, the WCD1 802 may further transmit a portion of the PSSCH that is FDMed with the PSCCH on the first beam, the second beam, or a third beam that is different than both the first and second beams. In this example, the FDMed PSSCH portion may be transmitted on the second beam or the third beam when a beam capability of at least the WCD1 802 (or the WCD1 802 and the WCD2 804) supports multiple simultaneous beams (e.g., two beams).

Figure 9:
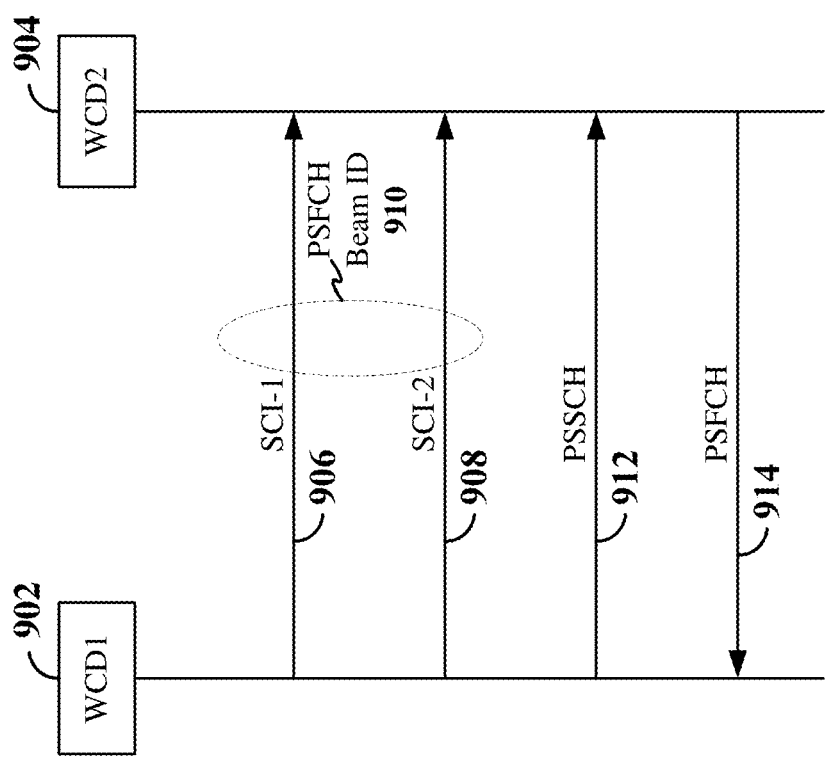
FIG. 9 is a signaling diagram illustrating another example of sidelink beam indication according to some aspects.

FIG. 9 is a signaling diagram illustrating another example of sidelink beam indication according to some aspects. In the example shown in FIG. 9, a first wireless communication device (WCD1) 902 is in wireless communication with a second wireless communication device (WCD2) 904 over a sidelink channel. Each of WCD1 902 and WCD2 904 may correspond to any of the scheduled entities, UEs, V2X devices, or D2D devices shown in FIGS. 1-5 and/or 8.

At 906, the WCD1 902, which may be a transmitting wireless communication device, transmits SCI-1 to WCD2 904. The SCI-1 may include, for example, a resource allocation on a sidelink carrier for sidelink data traffic (PSSCH) and second stage SCI (SCI-2). At 908, the WCD1 902 transmits the SCI-2 to the WCD2 904. The SCI-2 may contain further information related to the sidelink data traffic. The SCI-1 may be transmitted, for example, within a PSCCH, whereas SCI-2 may be transmitted within the PSSCH.

Each of the SCI-1 and SCI-2 may further be transmitted on a same beam, which may be configured, for example, based on a beam search and measurement procedure and/or updated via RAN RRC signaling, a RAN MAC-CE, or a sidelink MAC-CE. In addition, at least one of the SCI-1 or the SCI-2 may include a PSFCH beam identifier (ID) 910 identifying a selected beam for the WCD2 904 to transmit feedback information corresponding to the sidelink data traffic on a PSFCH. The PSFCH beam ID 910 may include, for example, a TCI state indicator that indicates a spatial property of the beam. In some examples, the SCI-1 and/or SCI-2 includes the PSFCH beam ID 910 when a length of a gap (e.g., in numbers of symbols) between a last SCI (e.g., SCI-1 or SCI-2) carrying the PSFCH beam ID and the PSFCH is greater than a threshold. For example, the threshold may be equal to one or more symbols.

At 912, the WCD1 902 transmits the PSSCH carrying the sidelink data traffic to the WCD2 904. In some examples, the SCI-1 and SCI-2 may be transmitted on a first beam and the sidelink data traffic may be transmitted on a second beam that is the same as or different than the first beam. In some examples, the WCD1 902 may transmit a portion of the PSSCH that is TDMed with the PSCCH on a different second beam (e.g., different than the first beam) and a portion of the PSSCH that is FDMed with the PSCCH on the first beam, the different second beam, or a third beam that is different than both the first and second beams. In this example, the FDMed PSSCH portion may be transmitted on the different second beam or the third beam when a beam capability of at least the WCD1 902 (or the WCD1 902 and the WCD2 904) supports multiple simultaneous beams (e.g., two beams).

At 914, the WCD2 904 transmits the PSFCH carrying the feedback information (e.g., HARQ ACK/NACK) to the WCD1 902 on the selected beam indicated by the PSFCH beam ID 910.

Figure 10:
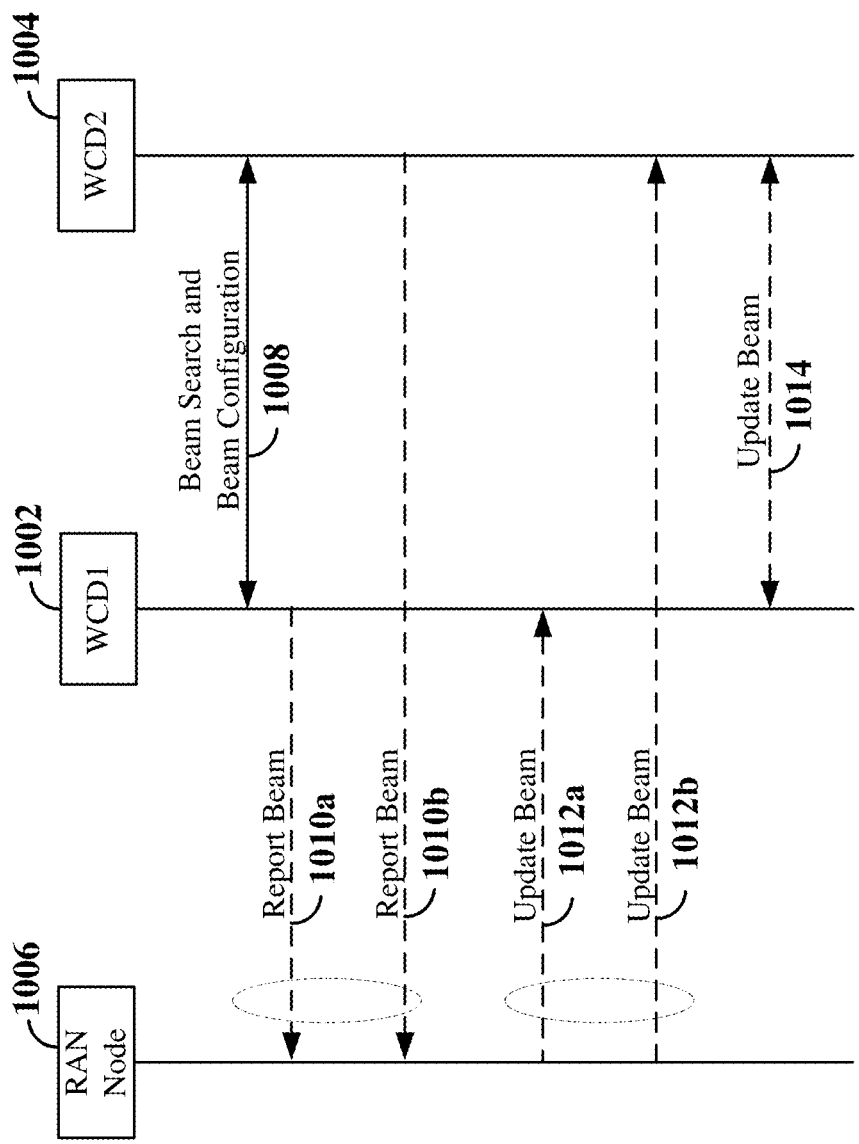
FIG. 10 is a signaling diagram illustrating another example of sidelink beam indication according to some aspects.

FIG. 10 is a signaling diagram illustrating another example of sidelink beam indication according to some aspects. In the example shown in FIG. 10, a first wireless communication device (WCD1) 1002 is in wireless communication with a second wireless communication device (WCD2) 1004 over a sidelink channel. Each of WCD1 1002 and WCD2 1004 may correspond to any of the scheduled entities, UEs, V2X device, or D2D devices shown in FIGS. 1-5, 8, and/or 9. In addition, a RAN node 1006 (e.g., a base station, such as a gNB) is in wireless communication with each of the WCDs 1002 and 1004 over respective cellular channels.

At 1008, the WCDs 1002 and 1004 perform a beam search and measurement procedure to configure one or more beams on the WCDs for communication therebetween on the sidelink channel. For example, the receiving WCD (e.g., WCD2 1004) may identify and measure a plurality of beams of a transmitting WCD (e.g., WCD 1002). The WCD2 1004 may then generate and transmit a beam measurement report to the WCD1 1002 indicating the beam quality (e.g., RSRP, SINR, or RSRQ) of one or more of the measured beams. The WCD1 1002 may either select one or more beams for communication with the WCD2 1004 based on the beam measurement report or forward the beam measurement report to the RAN node 1006 for selection of the beam(s), as indicated at 1010a and 1010b.

The configured beam(s) may include, for example, a first beam for communication of SCI-1 and SCI-2. In examples in which the beam capability of the WCD1 1002 (or the WCD1 1002 and WCD2 1004) support multiple simultaneous beams (e.g., two beams), the configured beam(s) may further include a second beam for communication of a portion of a PSSCH carrying sidelink data traffic that is FDMed with the SCI-1. For example, the selected beam for the SCI-1 and SCI-2 may be the beam having a highest beam quality associated with a first antenna panel of the WCD1 1002 and the selected beam for the FDMed portion of the sidelink data traffic may be the beam having a highest beam quality associated with a second antenna panel of the WCD1 1002.

The configured beam(s) may further include a configured beam for a TDMed portion of the PSSCH carrying sidelink data traffic. In some examples, the WCD1 1002 and WCD2 1004 may be configured to use the first beam or the second beam for the TDMed PSSCH portion. In addition, the configured beam(s) may further include a configured beam for a PSFCH carrying feedback information corresponding to the sidelink data traffic (e.g., HARQ ACK/NACK for the sidelink data traffic). In some examples, the WCD1 1002 and WCD2 1004 may be configured to use the same beam as the TDMed PSSCH portion or other default beam.

At 1012a and 1012b, the RAN node 1006 may optionally update one or more of the configured beam(s) on the WCD1 1002 and WCD2 1004 via, for example, RRC signaling or a RAN MAC-CE. At 1014, the WCD1 1002 and WCD2 1004 may update one or more of the configured beam(s) thereon via, for example, a sidelink MAC-CE. In some examples, the WCD2 1004 (which may be a receiving WCD) may update the configured beam(s) by transmitting a sidelink MAC-CE to the WCD1 1002. The WCD2 1004 may initiate the beam update based on, for example, an observed channel quality of the sidelink channel.

Figure 11:
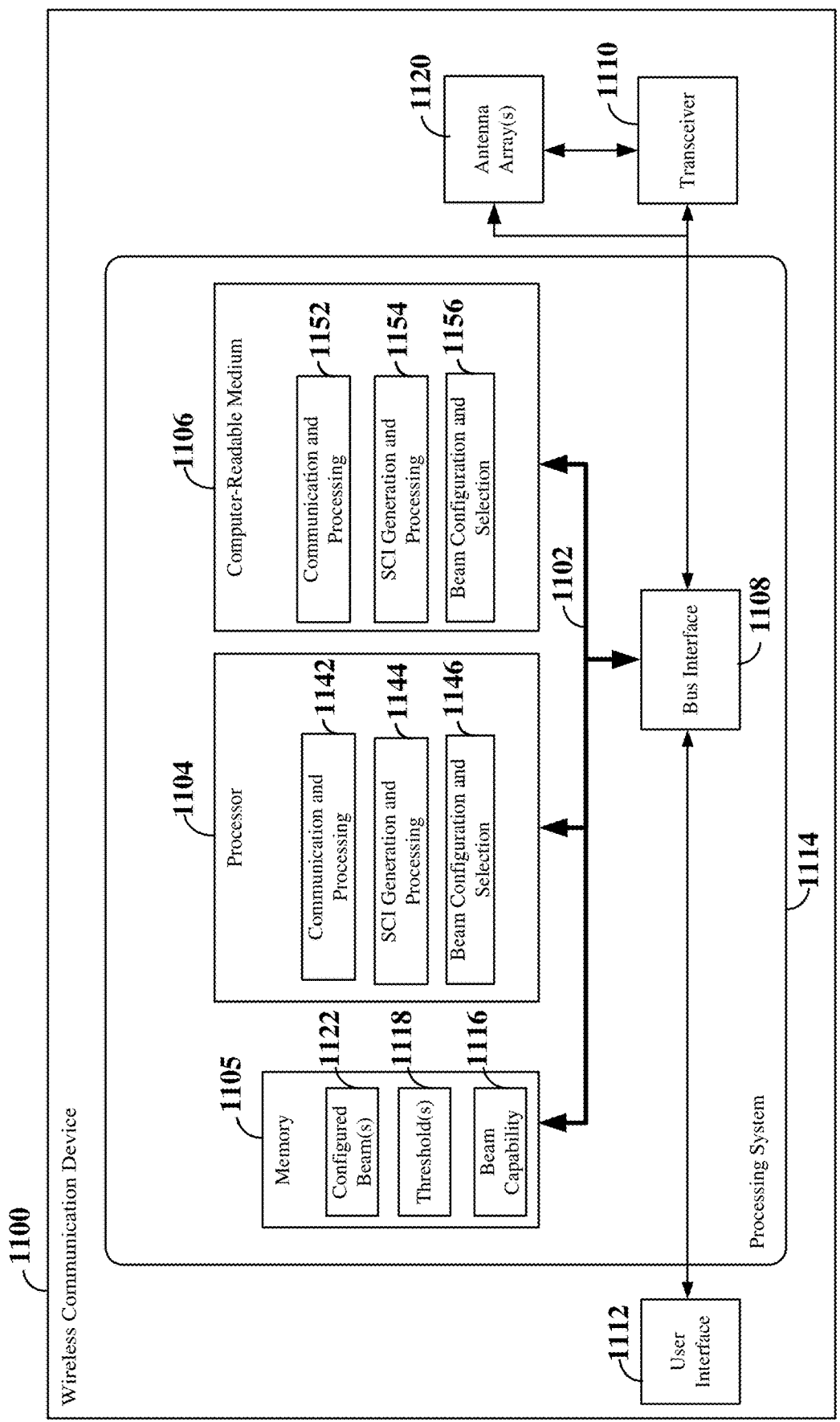
FIG. 11 is a block diagram illustrating an example of a hardware implementation for a wireless communication device employing a processing system according to some aspects.

FIG. 11 is a block diagram illustrating an example of a hardware implementation for a wireless communication device 1100 employing a processing system 1114. For example, the wireless communication device 1100 may correspond to a UE, V2X device, D2D device or other scheduled entity, as shown and described above in reference to FIGS. 1-5, and/or 8-10.

The wireless communication device 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1100 may be configured to perform any one or more of the functions described herein. That is, the processor 1104, as utilized in the wireless communication device 1100, may be used to implement any one or more of the processes and procedures described below.

The processor 1104 may in some instances be implemented via a baseband or modem chip and in other implementations, the processor 1104 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further.

A bus interface 1108 provides an interface between the bus 1102 and a transceiver 1110 and one or more antenna arrays 1120 (e.g., one or more antenna panels). The transceiver 1110 provides a means for communicating with various other apparatus over a transmission medium (e.g., air interface). Depending upon the nature of the apparatus, a user interface 1112 (e.g., keypad, display, touch screen, speaker, microphone, control knobs, etc.) may also be provided. Of course, such a user interface 1112 is optional, and may be omitted in some examples.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software. For example, the memory 1105 may store a beam capability 1116, one or more threshold(s) 1118, and/or one or more configured beam(s) 1122 used by the processor 1104 in processing sidelink transmissions.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. In some examples, the computer-readable medium 1106 may be part of the memory 1105. Those skilled in the art will recognize how best to implement the described functionality presented throughout this disclosure depending on the particular application and the overall design constraints imposed on the overall system.

In some aspects of the disclosure, the processor 1104 may include circuitry configured for various functions. For example, the processor 1104 may include communication and processing circuitry 1142, configured to communicate with a RAN node (e.g., a base station, such as a gNB) via a cellular (e.g., Uu) interface and one or more other wireless communication devices via a sidelink (e.g., PC5) interface. In some examples, the communication and processing circuitry 1142 may include one or more hardware components that provide the physical structure that performs processes related to wireless communication (e.g., signal reception and/or signal transmission) and signal processing (e.g., processing a received signal and/or processing a signal for transmission).

In some implementations where the communication involves receiving information, the communication and processing circuitry 1142 may obtain information from a component of the wireless communication device 1100 (e.g., from the transceiver 1110 that receives the information via radio frequency signaling or some other type of signaling suitable for the applicable communication medium), process (e.g., decode) the information, and output the processed information. For example, the communication and processing circuitry 1142 may output the information to another component of the processor 1104, to the memory 1105, or to the bus interface 1108. In some examples, the communication and processing circuitry 1142 may receive one or more of signals, messages, other information, or any combination thereof. In some examples, the communication and processing circuitry 1142 may receive information via one or more channels. In some examples, the communication and processing circuitry 1142 may include functionality for a means for receiving. In some examples, the communication and processing circuitry 1142 may include functionality for a means for processing, including a means for demodulating, a means for decoding, etc.

In some implementations where the communication involves sending (e.g., transmitting) information, the communication and processing circuitry 1142 may obtain information (e.g., from another component of the processor 1104, the memory 1105, or the bus interface 1108), process (e.g., modulate, encode, etc.) the information, and output the processed information. For example, the communication and processing circuitry 1142 may output the information to the transceiver 1110 (e.g., that transmits the information via radio frequency signaling or some other type of signaling suitable for the applicable communication medium). In some examples, the communication and processing circuitry 1142 may send one or more of signals, messages, other information, or any combination thereof. In some examples, the communication and processing circuitry 1142 may send information via one or more channels. In some examples, the communication and processing circuitry 1142 may include functionality for a means for sending (e.g., a means for transmitting). In some examples, the communication and processing circuitry 1142 may include functionality for a means for generating, including a means for modulating, a means for encoding, etc.

In some examples, the communication and processing circuitry 1142 may be configured to generate and transmit reference signals (e.g., sidelink SSB and/or sidelink CSI-RS) on one or more sidelink beams in a beam-sweep manner using the transceiver 1110 and the antenna array(s) 1120 to a receiving wireless communication and to receive a beam measurement report from the receiving wireless communication device in response to the beam reference signals. In some examples, the communication and processing circuitry 1142 may be configured to receive the beam reference signals from a transmitting wireless communication device using the transceiver 1110 and antenna array(s) 1120, measure a respective beam quality (e.g., RSRP, SINR, or RSRQ) of each of the beam reference signals and to generate and transmit a beam measurement report including the respective beam quality of one or more of the beams to the transmitting wireless communication device via the transceiver 1110.

The communication and processing circuitry 1142 may further be configured to transmit a PSCCH including SCI-1 and a PSSCH including SCI-2, one or more DMRS, and sidelink data traffic on one or more beams to a receiving wireless communication device using the transceiver 1110 and the antenna array(s) 1120. For example, the communication and processing circuitry 1142 may be configured to transmit the SCI-1 and SCI-2 on a first beam formed using the antenna array(s) 1120 and the sidelink data traffic on a second beam formed using the antenna array(s) 1120. In some examples, the second beam may be the same as or different than the first beam. In some examples, a portion of the sidelink data traffic that is TDMed with the PSCCH (SCI-1) is transmitted on a different second beam (e.g., different than the first beam) and a portion of the sidelink data traffic that is FDMed with the PSCCH is transmitted on the first beam, the different second beam, or a third beam that is different than both the first and second beams. In this example, the FDMed PSSCH portion may be transmitted on the different second beam or the third beam when a beam capability 1116 of at least the transmitting wireless communication device 1100 supports multiple simultaneous beams (e.g., two beams). The beam capability 1116 may be stored, for example, in memory 1105 and may be transmitted to the receiving wireless communication device upon establishing the sidelink channel with the receiving wireless communication device.

The communication and processing circuitry 1142 may further be configured to receive feedback information (e.g., HARQ ACK/NACK) corresponding to the sidelink data traffic on a PSFCH from the receiving wireless communication device via the transceiver and antenna array(s). In some examples, the feedback information may be received on the same beam as the selected PSSCH transmit beam used for transmission of the sidelink data traffic to the receiving wireless communication device. In other examples, the feedback information may be received on a different beam than the PSSCH (e.g., a selected PSFCH beam indicated in the SCI-1 and/or SCI-2 or a default beam).

The communication and processing circuitry 1142 may further be configured to receive a respective reference signal (e.g., sidelink SSB and/or sidelink CSI-RS) on each of a plurality of beams from a transmitting wireless communication device and measure the beam quality (e.g., RSRP, SINR, or RSRQ) of each of the beams. The communication and processing circuitry 1142 may further be configured to generate and transmit a beam measurement report to the transmitting wireless communication device including the respective beam quality of at least one of the beams.

The communication and processing circuitry 1142 may further be configured to receive and process the SCI-1, SCI-2, and sidelink data traffic on one or more receive beams from the transmitting wireless communication device using the transceiver 1110 and antenna array(s) 1120. The SCI-1 and SCI-2 may indicate allocated resources and other information related to the sidelink data traffic. In some examples, the SCI-1 and SCI-2 may be received on a first beam (e.g., a receive beam of a BPL with the transmit beam). In some examples, at least one of the SCI-1 or SCI-2 includes a beam identifier (ID) identifying a selected beam (second beam different than the first beam) on which the receiving wireless communication device may receive the sidelink data traffic. For example, the beam ID may indicate the selected beam for receiving the TDMed portion of the PSSCH. The beam ID may correspond, for example, to a TCI state indicator indicating the selected beam. Any FDMed portion of the PSSCH carrying sidelink data traffic may be received on the same beam as the SCI-1 and SCI-2 beam or a different third beam when the beam capability 1116 of at least the transmitting wireless communication device supports multiple simultaneous beams (e.g., two beams). In some examples, the TDMed portion of the PSSCH may be received on the PSCCH beam (first beam) or the third beam utilized for receiving the FDMed PSSCH portion.

In some examples, the communication and processing circuitry 1142 may further be configured to generate feedback information (e.g., HARQ ACK/NACK) based on a decoding attempt of the sidelink data traffic. The communication and processing circuitry 1142 may further be configured to transmit the feedback information to the transmitting wireless communication device in a PSFCH on a selected transmit beam for the PSFCH using the transceiver 1110 and antenna array(s) 1120. In some examples, the SCI-1 and/or SCI-2 may include a beam ID of the selected PSFCH beam. In other examples, a default beam (e.g., the receive beam of the PSSCH) may be used. The communication and processing circuitry 1142 may further be configured to execute communication and processing software 1152 stored in the computer-readable medium 1106 to implement one or more of the functions described herein.

The processor 1104 may further include SCI generation and processing circuitry 1144, configured to generate the SCI-1 and SCI-2 for the sidelink data traffic. In some examples, the SCI generation and processing circuitry 1144 may be configured to include a respective beam ID of at least one of the sidelink data traffic (e.g., the TDMed PSSCH portion) or the PSFCH within at least one of the SCI-1 or SCI-2. In some examples, the SCI generation and processing circuitry 1144 may utilize one or more threshold(s) 1118 stored, for example, in memory 1105 to determine whether to include the respective beam ID(s) of the sidelink data traffic or the PSFCH in the SCI-1 and/or SCI-2. For example, the SCI generation and processing circuitry 1144 may utilize a first threshold 1118 to determine whether to include the beam ID of the sidelink data traffic in SCI-1 and/or SCI-2 and a second threshold 1118 to determine whether to include the beam ID of the PSFCH in SCI-1 and/or SCI-2.

In some examples, the SCI generation and processing circuitry 1144 may further be configured to determine a length of a gap (e.g., in number(s) of symbols) between a last SCI (e.g., SCI-1 or SCI-2) that may carry the beam ID of the sidelink data traffic and the sidelink data traffic. For example, the SCI generation and processing circuitry 1144 may determine a last symbol of a slot that may carry the beam ID of the sidelink data traffic and a first symbol in the slot allocated for the sidelink data traffic. The SCI generation and processing circuitry 1144 may then be configured to compare the length of the gap to the first threshold. When the length of the gap is greater than the first threshold, the SCI generation and processing circuitry 1144 may be configured to include the beam ID of the sidelink data traffic in the SCI-1 and/or SCI-2. When the length of the gap is less than or equal to the first threshold, the SCI generation and processing circuitry 1144 may be configured to not include the beam ID of the sidelink data traffic in the SCI-1 and/or SCI-2.

In some examples, the SCI generation and processing circuitry 1144 may further be configured to determine a length of an additional gap (e.g., in number(s) of symbols) between a last SCI (e.g., SCI-1 or SCI-2) that may carry the beam ID of the PSFCH and the PSFCH. For example, the SCI generation and processing circuitry 1144 may determine a last symbol of a slot that may carry the beam ID of the PSFCH and a first symbol in the slot or a subsequent slot allocated for the PSFCH. The SCI generation and processing circuitry 1144 may then be configured to compare the length of the additional gap to the second threshold. When the length of the additional gap is greater than the second threshold, the SCI generation and processing circuitry 1144 may be configured to include the beam ID of the PSFCH in the SCI-1 and/or SCI-2. When the length of the additional gap is less than or equal to the second threshold, the SCI generation and processing circuitry 1144 may be configured to not include the beam ID of the PSFCH in the SCI-1 and/or SCI-2.

The SCI generation and processing circuitry 1144 may further be configured to receive and process the SCI-1 and SCI-2 to determine whether the SCI-1 and/or SCI-2 includes a respective beam ID for at least one of the sidelink data traffic or the feedback information. The SCI generation and processing circuitry 1144 may further be configured to execute SCI generation and processing software 1154 stored in the computer-readable medium 1106 to implement one or more of the functions described herein.

The processor 1104 may further include beam configuration and selection circuitry 1146 configured to configure one or more configured beam(s) 1122 on the wireless communication device. The configured beam(s) 1122 may be pre-configured prior to transmission or reception of SCI-1, SCI-2, sidelink data traffic or the PSFCH. Thus, with configured beam(s) 1122, the beam configuration and selection circuitry 1146 may select the corresponding previously configured beam for transmission or reception of the SCI-1, SCI-2, sidelink data traffic or the PSFCH. In some examples, the beam configuration and selection circuitry 1146 may configure the configured beam(s) based on the beam measurement report. For example, the beam configuration and selection circuitry 1146 may be configured to configure a first beam (transmit or receive beam) 1122 for transmitting or receiving SCI-1 and SCI-2 over a sidelink channel with another wireless communication device. In some examples, the first beam may be the beam having a highest beam quality (on at least one antenna panel of the transmitting wireless communication device) in the beam measurement report. In other examples, the first beam may be updated via RAN RRC signaling, a RAN MAC-CE or a sidelink MAC-CE received by the communication and processing circuitry 1142.

In some examples, the beam configuration and selection circuitry 1146 may further be configured to configure a third beam (transmit or receive beam) 1122 for transmitting or receiving an FDMed portion of a PSSCH carrying sidelink data traffic. The third beam may be different from the first beam when the beam capability 1116 of at least the transmitting wireless communication device supports multiple simultaneous beams (e.g., two beams). In some examples, the first beam may be the beam having a highest beam quality associated with a first antenna panel 1120 of the transmitting wireless communication device and the third beam for the FDMed portion of the sidelink data traffic may be the beam having a highest beam quality associated with a second antenna panel 1120 of the transmitting wireless communication device. In other examples, the third beam may be updated via RAN RRC signaling, a RAN MAC-CE or a sidelink MAC-CE received by the communication and processing circuitry 1142.

In some examples, the beam configuration and selection circuitry 1146 may further be configured to select a second beam for transmitting the TDMed portion of the PSSCH carrying the sidelink data traffic. In some examples, the selected second beam may be the first beam or the third beam (one of the configured beams 1122) when the SCI generation and processing circuitry 1144 determines that the length of the gap is less than or equal to the first threshold 1118. In other examples, when the SCI generation and processing circuitry 1144 determines that the length of the gap is greater than the first threshold 1118, the beam configuration and selection circuitry 1146 may select a different beam than the first beam or the third beam as the second beam for the TDMed PSSCH portion. In examples in which the wireless communication device 1100 is a receiving wireless communication device, the beam configuration and selection circuitry 1146 may further be configured to identify the second beam for use in receiving the TDMed PSSCH portion based on the beam ID included in the SCI-1 and/or SCI-2.

The beam configuration and selection circuitry 1146 may further be configured to select a second beam for transmitting or receiving the TDMed portion of the PSSCH carrying the sidelink data traffic. In some examples, the selected second beam may be the first beam or the third beam (one of the configured beams 1122) when the SCI generation and processing circuitry 1144 determines that the length of the gap is less than or equal to the first threshold 1118. In other examples, when the SCI generation and processing circuitry 1144 determines that the length of the gap is greater than the first threshold 1118, and the wireless communication device 1100 is a transmitting wireless communication device, the beam configuration and selection circuitry 1146 may select a different beam than the first beam or the third beam as the second beam for the TDMed PSSCH portion. In examples in which the wireless communication device 1100 is a receiving wireless communication device, the beam configuration and selection circuitry 1146 may further be configured to identify the second beam for use in receiving the TDMed PSSCH portion based on the beam ID included in the SCI-1 and/or SCI-2.

The beam configuration and selection circuitry 1146 may further be configured to select a fourth beam for transmitting or receiving the PSFCH carrying the feedback information corresponding to the sidelink data traffic. In some examples, the fourth beam may be the same as the second beam or other default beam when the SCI generation and processing circuitry 1144 determines that the length of the additional gap is less than or equal to the second threshold 1118. For example, the default beam may be a configured beam 1122 (e.g., one of the first beam or the third beam or a different configured beam). In other examples, when the SCI generation and processing circuitry 1144 determines that the length of the additional gap is greater than the second threshold 1118, and the wireless communication device 1100 is a transmitting wireless communication device, the beam configuration and selection circuitry 1146 may select a different beam as the fourth beam. For example, the different beam may be the first beam, the third beam, or another beam. In examples in which the wireless communication device 1100 is a receiving wireless communication device, the beam configuration and selection circuitry 1146 may further be configured to identify the fourth beam for use in transmitting the PSFCH based on the beam ID included in the SCI-1 and/or SCI-2.

The beam configuration and selection circuitry 1146 may further be configured to control the antenna array(s) 1120 to form the respective beams for the SCI-1, SCI-2, sidelink data traffic, and PSFCH. The beam configuration and selection circuitry 1146 may further be configured to execute beam configuration and selection software 1156 stored in the computer-readable medium 1106 to implement one or more of the functions described herein.

Figure 12:
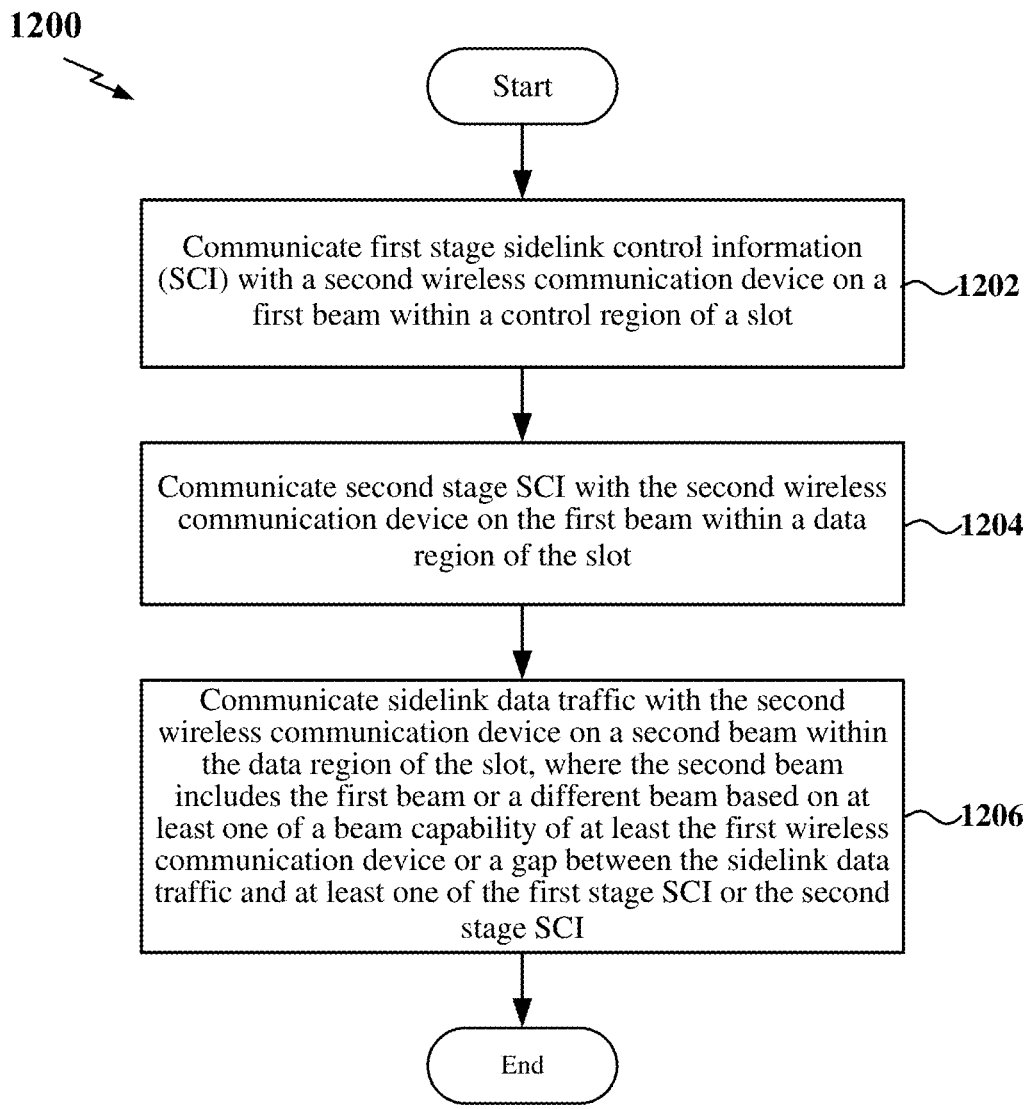
FIG. 12 is a flow chart of an exemplary method for sidelink communication using one or more sidelink beams according to some aspects.

FIG. 12 is a flow chart 1200 of an exemplary method for sidelink communication using one or more sidelink beams according to some aspects. As described below, some or all illustrated features may be omitted in a particular implementation within the scope of the present disclosure, and some illustrated features may not be required for implementation of all examples. In some examples, the method may be performed by the wireless communication device 1100, as described above and illustrated in FIG. 11, by a processor or processing system, or by any suitable means for carrying out the described functions.

At block 1202, a first wireless communication device may communicate first stage sidelink control information (SCI) with a second wireless communication device on a first beam within a control region of a slot. At block 1204, the first wireless communication device may further communicate second stage SCI with the second wireless communication device on the first beam within a data region of the slot. The first beam may be configured based on a sidelink beam search and measurement procedure, and may further be updated based on a sidelink MAC-CE, a RAN MAC-CE, or a RAN RRC message. The first stage SCI and the second stage SCI may collectively include a resource allocation and other information related to sidelink data traffic to be communicated within the data region of the slot. In addition, at least one of the first stage SCI or second stage SCI may include a respective beam identifier (ID) for at least one of the sidelink data traffic (e.g., TDMed PSSCH portion) or feedback information (e.g., PSFCH) corresponding to the sidelink data traffic. For example, the SCI generation and processing circuitry 1144, together with the communication and processing circuitry 1142, beam configuration and selection circuitry 1146, transceiver 1110 and antenna array(s) 1120, shown and described above in connection with FIG. 11, may provide a means to communicate the first stage SCI and the second stage SCI with the second communication device on the first beam.

At block 1206, the first wireless communication device may communicate sidelink data traffic with the second wireless communication device on a second beam within the data region of the slot. The second beam may include the first beam or a different beam based on at least one of a beam capability of at least the first wireless communication device or a gap between the sidelink data traffic and at least one of the first stage SCI or the second stage SCI. For example, the sidelink data traffic may include a FDMed PSSCH portion and a TDMed PSSCH portion. The second beam on which the FDMed PSSCH portion is communicated may be configured as the first beam or a third beam (e.g., the third beam may be configured when the beam capability of at least the first wireless communication device supports multiple simultaneous beams). The second beam on which the TDMed PSSCH portion is communicated may be configured as the first beam or the third beam when a length of the gap is less than or equal to a threshold. The second beam on which the TDMed PSSCH portion is communicated may be the different beam when the length of the gap is greater than the threshold. In this example, a beam identifier (ID) of the second beam (different beam) may be included in the SCI-1 and/or SCI-2. For example, the communication and processing circuitry 1142, together with the beam configuration and selection circuitry 1146, transceiver 1110 and antenna array(s) 1120, shown and described above in connection with FIG. 11, may provide a means to communicate the sidelink data traffic with the second wireless communication device on the second beam.

Figure 13:
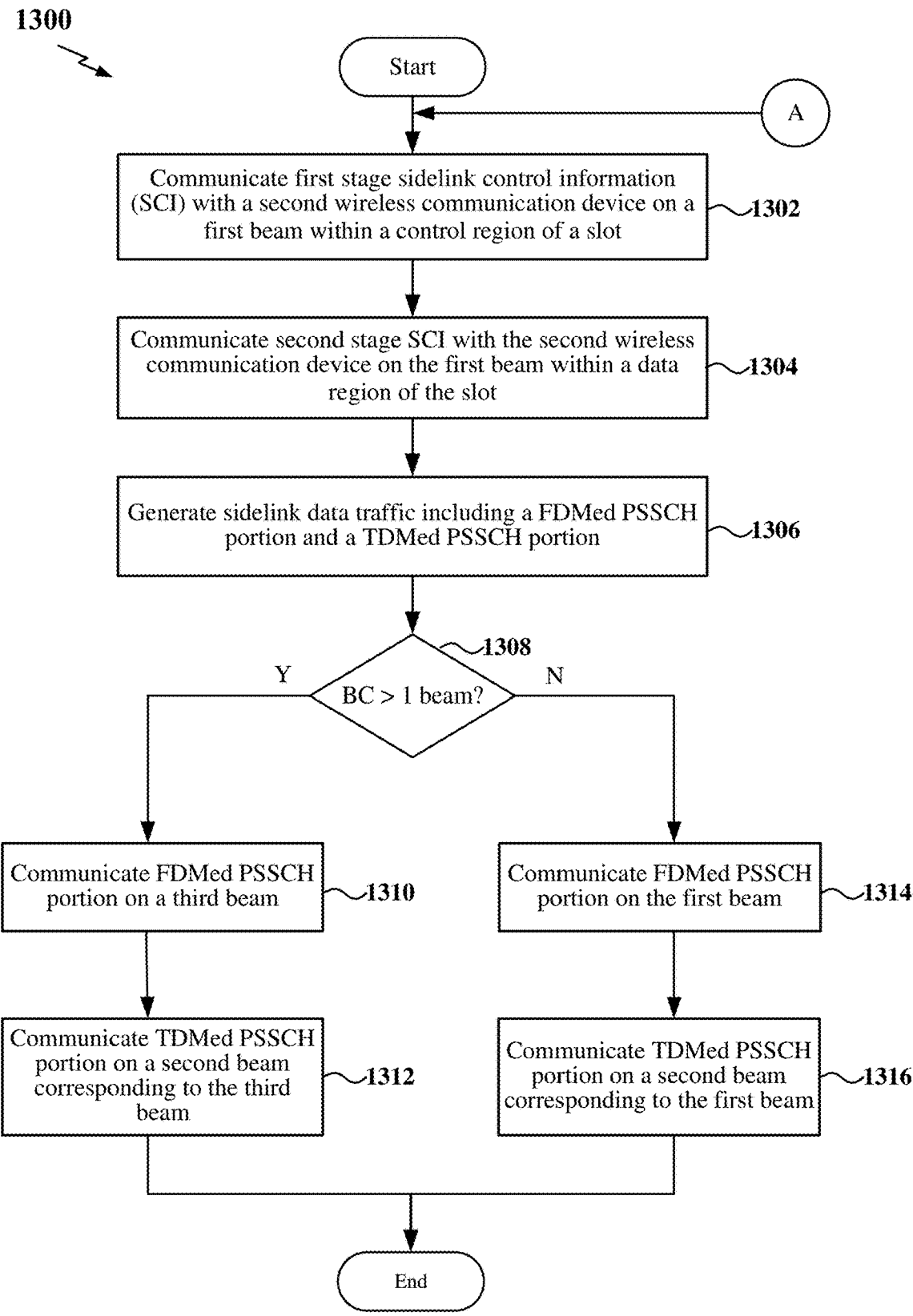
FIG. 13 is a flow chart of another exemplary method for sidelink communication using one or more sidelink beams according to some aspects.

FIG. 13 is a flow chart 1300 of another exemplary method for sidelink communication using one or more sidelink beams according to some aspects. As described below, some or all illustrated features may be omitted in a particular implementation within the scope of the present disclosure, and some illustrated features may not be required for implementation of all examples. In some examples, the method may be performed by the wireless communication device 1100, as described above and illustrated in FIG. 11, by a processor or processing system, or by any suitable means for carrying out the described functions.

At block 1302, a first wireless communication device may communicate first stage sidelink control information (SCI) with a second wireless communication device on a first beam within a control region of a slot. At block 1304, the first wireless communication device may further communicate second stage SCI with the second wireless communication device on the first beam within a data region of the slot. The first beam may be configured based on a sidelink beam search and measurement procedure, and may further be updated based on a sidelink MAC-CE, a RAN MAC-CE, or a RAN RRC message. The first stage SCI and the second stage SCI may collectively include a resource allocation and other information related to sidelink data traffic to be communicated within the data region of the slot. For example, the SCI generation and processing circuitry 1144, together with the communication and processing circuitry 1142, beam configuration and selection circuitry 1146, transceiver 1110 and antenna array(s) 1120, shown and described above in connection with FIG. 11, may provide a means to communicate the first stage SCI and the second stage SCI with the second communication device on the first beam.

At block 1306, the first wireless communication device may generate the sidelink data traffic including a FDMed PSSCH portion and a TDMed PSSCH portion. For example, the communication and processing circuitry 1142 shown and described above in connection with FIG. 11 may generate the sidelink data traffic. At block 1308, the first wireless communication device may determine whether the beam capability (BC) of at least the transmitting wireless communication device (e.g., the wireless communication device transmitting the SCI-1, SCI-2, and sidelink data traffic) supports simultaneous communication on more than one beam (e.g., BC>1 beam). For example, the beam configuration and selection circuitry 1146 shown and described above in connection with FIG. 11 may provide a means to determine whether the beam capability supports multiple simultaneous beams.

When simultaneous communication on more than one beam is supported (Y branch of block 1308), at block 1310, the first wireless communication device may communicate the FDMed PSSCH portion of the sidelink data traffic on a third beam. In some examples, the third beam may be configured based on the beam measurement report. For example, the third beam may have a highest beam quality on one of the antenna panels of the transmitting wireless communication device, while the first beam may have a highest beam quality on the other antenna panel of the transmitting wireless communication device. The third beam may further be updated based on a sidelink MAC-CE, a RAN MAC-CE, or a RAN RRC message. For example, the communication and processing circuitry 1142, together with the beam configuration and selection circuitry 1146, transceiver 1110, and antenna array(s) 1120 may provide a means to communicate the FDMed PSSCH portion on the third beam.

At block 1312, the first wireless communication device may communicate the TDMed PSSCH portion of the sidelink data traffic on a second beam corresponding to the first beam or the third beam. In some examples, the first or third beam may be pre-configured on the wireless communication devices as the second beam. For example, the communication and processing circuitry 1142, together with the beam configuration and selection circuitry 1146, transceiver 1110, and antenna array(s) 1120 may provide a means to communicate the TDMed PSSCH portion on the second beam.

When simultaneous communication on more than one beam is not supported (N branch of block 1308), at block 1314, the first wireless communication device may communicate the FDMed PSSCH portion of the sidelink data traffic on the first beam. For example, the communication and processing circuitry 1142, together with the beam configuration and selection circuitry 1146, transceiver 1110, and antenna array(s) 1120 may provide a means to communicate the TDMed PSSCH portion on the first beam.

At block 1316, the first wireless communication device may communicate the TDMed PSSCH portion of the sidelink data traffic on a second beam corresponding to the first beam. For example, the communication and processing circuitry 1142, together with the beam configuration and selection circuitry 1146, transceiver 1110, and antenna array(s) 1120 may provide a means to communicate the TDMed PSSCH portion on the second beam.

Figure 14:
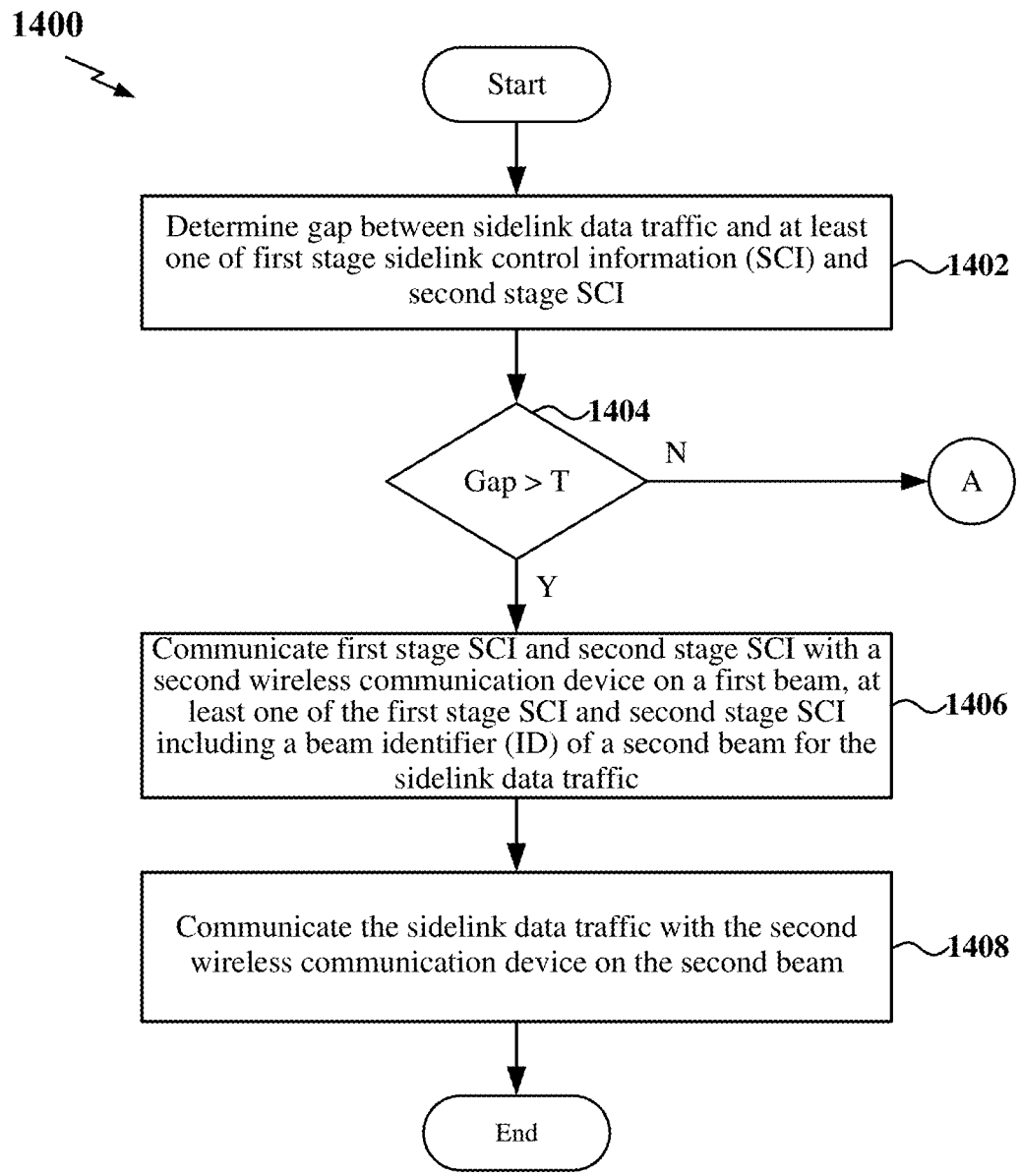
FIG. 14 is a flow chart of another exemplary method for sidelink communication using one or more sidelink beams according to some aspects.

FIG. 14 is a flow chart 1400 of another exemplary method for sidelink communication using one or more sidelink beams according to some aspects. As described below, some or all illustrated features may be omitted in a particular implementation within the scope of the present disclosure, and some illustrated features may not be required for implementation of all examples. In some examples, the method may be performed by the wireless communication device 1100, as described above and illustrated in FIG. 11, by a processor or processing system, or by any suitable means for carrying out the described functions.

At block 1402, a first wireless communication device may determine a gap between sidelink data traffic and at least one of first stage sidelink control information (SCI) or second stage SCI in a slot. In some examples, the gap may include at least one of the second stage SCI or a demodulation reference signal (DMRS) for the sidelink data traffic when the gap is between the sidelink data traffic and the first stage SCI. In some examples, the gap may include zero or more symbols (e.g., OFDM symbols) of the slot. For example, the SCI generation and processing circuitry 1144 shown and described above in connection with FIG. 11 may provide a means to determine the gap.

At block 1404, the first wireless communication device may determine whether a length of the gap (e.g., in number(s) of symbols) is greater than a threshold. In some examples, the threshold may correspond to an original gap length when the gap is between the sidelink data traffic and the first stage SCI. The original gap length may allow sufficient time for decoding of the first stage SCI and forming a new beam at a receiving wireless communication device. In other examples, the threshold may correspond to an extended gap length longer than the original gap length when the gap is between the sidelink data traffic and the second stage SCI. The extended gap length may allow sufficient time for decoding of the first stage SCI and second stage SCI and forming a new beam at the receiving wireless communication device. In some examples, the threshold may be configured based on a capability of the receiving wireless communication device. For example, the SCI generation and processing circuitry 1144 shown and described above in connection with FIG. 11 may provide a means to determine whether the length of the gap is greater than the threshold.

When the length of the gap is less than or equal to the threshold (N branch of block 1404), the method may proceed to FIG. 13. When the length of the gap is greater than the threshold (Y branch of block 1404), at block 1406, the first wireless communication device may communicate the first stage SCI and the second stage SCI with a second wireless communication device on a first beam. At least one of the first stage SCI and the second stage SCI may include a beam identifier (ID) of a second beam for the sidelink data traffic. For example, the second beam may be a different beam than the first beam. The first stage SCI may be communicated within a control region of a slot, whereas the second stage SCI may be communicated within a data region of the slot. The first beam may be configured based on a sidelink beam search and measurement procedure, and may further be updated based on a sidelink MAC-CE, a RAN MAC-CE, or a RAN RRC message. The first stage SCI and the second stage SCI may collectively include a resource allocation and other information related to the sidelink data traffic to be communicated within the data region of the slot. For example, the SCI generation and processing circuitry 1144, together with the communication and processing circuitry 1142, beam configuration and selection circuitry 1146, transceiver 1110 and antenna array(s) 1120, shown and described above in connection with FIG. 11, may provide a means to communicate the first stage SCI and the second stage SCI with the second communication device on the first beam.

At block 1408, the first wireless communication device may communicate sidelink data traffic with the second wireless communication device on the second beam within the data region of the slot. In some examples, the sidelink data traffic may include a FDMed PSSCH portion and a TDMed PSSCH portion. The FDMed PSSCH portion may be communicated on the first beam or a third beam (e.g., the third beam may be configured when the beam capability of at least the first wireless communication device supports multiple simultaneous beams). The TDMed PSSCH portion may be communicated on the second beam. For example, the communication and processing circuitry 1142, together with the beam configuration and selection circuitry 1146, transceiver 1110 and antenna array(s) 1120, shown and described above in connection with FIG. 11, may provide a means to communicate the sidelink data traffic with the second wireless communication device on the second beam.

In one configuration, the wireless communication device 1100 includes means for sidelink beam configuration and indication as described in the present disclosure. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1-5, and/or 8-10, and utilizing, for example, the processes and/or algorithms described herein in relation to FIGS. 12-14.

The processes shown in FIGS. 12-14 may include additional aspects, such as any single aspect or any combination of aspects described below and/or in connection with one or more other processes described elsewhere herein.

Aspect 1: A method of sidelink wireless communication at a first wireless communication device, the method comprising: communicating first stage sidelink control information (SCI) with a second wireless communication device on a first beam within a control region of a slot; communicating second stage SCI with the second wireless communication device on the first beam within a data region of the slot; and communicating sidelink data traffic with the second wireless communication device on a second beam within the data region of the slot, wherein the second beam comprises the first beam or a different beam based on at least one of a beam capability of at least the first wireless communication device or a gap between the sidelink data traffic and at least one of the first stage SCI or the second stage SCI.

Aspect 2: The method of aspect 1, wherein the sidelink data traffic comprises at least a first portion frequency division multiplexed with the first stage SCI.

Aspect 3: The method of aspect 2, wherein the second beam comprises the first beam for the first portion of the sidelink data traffic.

Aspect 4: The method of aspect 2, wherein the second beam comprises the different beam for the first portion of the sidelink data traffic when the beam capability of at least the first wireless communication device supports multiple simultaneous beams.

Aspect 5: The method of any of aspects 2 through 4, wherein the second beam is configured based on a sidelink beam search and measurement procedure, and further comprising: updating the second beam based on a sidelink medium access control (MAC) control element (MAC-CE), a radio access network (RAN) MAC-CE or a RAN radio resource control (RRC) message.

Aspect 6: The method of any of aspect 1, wherein the sidelink data traffic comprises at least a first portion time division multiplexed with the first stage SCI and the second stage SCI.

Aspect 7: The method of aspect 6, wherein the second beam comprises the first beam.

Aspect 8: The method of aspect 6, wherein the sidelink data traffic comprises a second portion frequency division multiplexed with at least one of the first stage SCI or the second stage SCI, and the second portion of the sidelink data traffic is transmitted on a third beam.

Aspect 9: The method of aspect 8, wherein the second beam comprises the first beam or the third beam.

Aspect 10: The method of aspect 8, wherein the third beam comprises the first beam or the different beam, the third beam comprising the different beam when the beam capability of at least the first wireless communication device supports multiple simultaneous beams.

Aspect 11: The method of any of aspect 6 through 8, wherein at least one of the first stage SCI or the second stage SCI comprises a beam identifier identifying the second beam when a length of the gap is greater than a threshold, wherein the gap comprises at least one of the second stage SCI or a demodulation reference signal (DMRS) for the sidelink data traffic.

Aspect 12: The method of aspect 11, wherein: the second stage SCI comprises the beam identifier, the threshold corresponds to an extended gap length longer than an original gap length utilized for the threshold when the first stage SCI comprises the beam identifier, and the threshold is configured based on a capability of the second wireless communication device.

Aspect 13: The method of any of aspects 1 through 12, further comprising: communicating feedback information corresponding to the sidelink data traffic with the second wireless communication device on a fourth beam.

Aspect 14: The method of aspect 13, wherein the fourth beam comprises the second beam.

Aspect 15: The method of aspect 13, wherein at least one of the first stage SCI or the second stage SCI comprises a beam identifier identifying the fourth beam when a length of an additional gap between a last one of the first stage SCI or the second stage SCI carrying the beam identifier is greater than a threshold, wherein the threshold is configured based on a capability of the second wireless communication device.

Aspect 16: The method of aspect 15, wherein the fourth beam comprises a default beam when the length of the additional gap between a last one of the first stage SCI or the second stage SCI carrying the beam identifier is less than or equal to the threshold.

Aspect 17: The method of any of aspects 13 through 16, wherein the fourth beam is configured based on a spatial relation indication, and further comprising: updating the fourth beam based on a sidelink medium access control (MAC) control element (MAC-CE), a radio access network (RAN) MAC-CE or a RAN radio resource control (RRC) message.

Aspect 18: The method of any of aspects 1 through 17, wherein the first beam is configured based on a sidelink beam search and measurement procedure, and further comprising: updating the first beam based on a sidelink medium access control (MAC) control element (MAC-CE), a radio access network (RAN) MAC-CE or a RAN radio resource control (RRC) message.

Aspect 19: A wireless communication device in a wireless communication network comprising a transceiver, a memory, and a processor coupled to the transceiver and the memory, the processor and the memory configured to perform a method of any one of aspects 1 through 18.

Aspect 20: A wireless communication device in a wireless communication network comprising at least one means for performing a method of any one of aspects 1 through 18.

Aspect 21: A non-transitory computer-readable medium having instructions stored therein for causing one or more processors of a wireless communication device to perform a method of any one of aspects 1 through 18.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-5 and/or 8-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of sidelink wireless communication at a first wireless communication device, the method comprising:
   communicating first stage sidelink control information (SCI) with a second wireless communication device on a first beam within a control region of a slot;
   communicating second stage SCI with the second wireless communication device on the first beam within a data region of the slot; and
   communicating sidelink data traffic with the second wireless communication device on a second beam within the data region of the slot, wherein the second beam is based on a gap between the sidelink data traffic and at least one of the first stage SCI or the second stage SCI.

2. The method of claim 1, wherein the sidelink data traffic comprises at least a first portion frequency division multiplexed with the first stage SCI.

3. The method of claim 2, wherein the second beam comprises the first beam for the first portion of the sidelink data traffic.

4. The method of claim 2, wherein the second beam comprises a different beam for the first portion of the sidelink data traffic when a beam capability of at least the first wireless communication device supports multiple simultaneous beams.

5. The method of claim 2, wherein the second beam is configured based on a sidelink beam search and measurement procedure, and further comprising:
   updating the second beam based on a sidelink medium access control (MAC) control element (MAC-CE), a radio access network (RAN) MAC-CE or a RAN radio resource control (RRC) message.

6. The method of claim 1, wherein the sidelink data traffic comprises at least a first portion time division multiplexed with the first stage SCI and the second stage SCI.

7. The method of claim 6, wherein the second beam comprises the first beam.

8. The method of claim 6, wherein the sidelink data traffic comprises a second portion frequency division multiplexed with at least one of the first stage SCI or the second stage SCI, and the second portion of the sidelink data traffic is transmitted on a third beam.

9. The method of claim 8, wherein the second beam comprises the first beam or the third beam.

10. The method of claim 8, wherein the third beam comprises the first beam or a different beam, the third beam comprising the different beam when a beam capability of at least the first wireless communication device supports multiple simultaneous beams.

11. The method of claim 6, wherein at least one of the first stage SCI or the second stage SCI comprises a beam identifier identifying the second beam when a length of the gap is greater than a threshold, wherein the gap comprises at least one of the second stage SCI or a demodulation reference signal (DMRS) for the sidelink data traffic.

12. The method of claim 11, wherein:
the second stage SCI comprises the beam identifier,
the threshold corresponds to an extended gap length longer than an original gap length utilized for the threshold when the first stage SCI comprises the beam identifier, and
the threshold is configured based on a capability of the second wireless communication device.

13. The method of claim 1, further comprising:
communicating feedback information corresponding to the sidelink data traffic with the second wireless communication device on a fourth beam.

14. The method of claim 13, wherein the fourth beam comprises the second beam.

15. The method of claim 13, wherein at least one of the first stage SCI or the second stage SCI comprises a beam identifier identifying the fourth beam when a length of an additional gap between a last one of the first stage SCI or the second stage SCI carrying the beam identifier is greater than a threshold, wherein the threshold is configured based on a capability of the second wireless communication device.

16. The method of claim 15, wherein the fourth beam comprises a default beam when the length of the additional gap between a last one of the first stage SCI or the second stage SCI carrying the beam identifier is less than or equal to the threshold.

17. The method of claim 13, wherein the fourth beam is configured based on a spatial relation indication, and further comprising:
updating the fourth beam based on a sidelink medium access control (MAC) control element (MAC-CE), a radio access network (RAN) MAC-CE or a RAN radio resource control (RRC) message.

18. The method of claim 1, wherein the first beam is configured based on a sidelink beam search and measurement procedure, and further comprising:
updating the first beam based on a sidelink medium access control (MAC) control element (MAC-CE), a radio access network (RAN) MAC-CE or a RAN radio resource control (RRC) message.

19. A first wireless communication device, comprising:
a transceiver;
a memory; and
a processor coupled to the transceiver and the memory, wherein the processor is configured to:
communicate first stage sidelink control information (SCI) with a second wireless communication device on a first beam within a control region of a slot via the transceiver;
communicate second stage SCI with the second wireless communication device on the first beam within a data region of the slot via the transceiver; and
communicate sidelink data traffic with the second wireless communication device on a second beam within the data region of the slot via the transceiver, wherein the second beam is based on a gap between the sidelink data traffic and at least one of the first stage SCI or the second stage SCI.

20. The first wireless communication device of claim 19, wherein the sidelink data traffic comprises at least a first portion frequency division multiplexed with the first stage SCI.

21. The first wireless communication device of claim 20, wherein the second beam comprises the first beam for the first portion of the sidelink data traffic or the second beam comprises a different beam for the first portion of the sidelink data traffic when a beam capability of at least the first wireless communication device supports multiple simultaneous beams.

22. The first wireless communication device of claim 20, wherein the second beam is configured based on a sidelink beam search and measurement procedure, and wherein the processor is further configured to:
update the second beam based on a sidelink medium access control (MAC) control element (MAC-CE), a radio access network (RAN) MAC-CE or a RAN radio resource control (RRC) message.

23. The first wireless communication device of claim 19, wherein the sidelink data traffic comprises a first portion time division multiplexed with the first stage SCI and the second stage SCI, and the second beam comprises the first beam.

24. The first wireless communication device of claim 19, wherein the sidelink data traffic comprises a first portion time division multiplexed with the first stage SCI and the second stage SCI and a second portion frequency division multiplexed with at least one of the first stage SCI or the second stage SCI, and the second portion of the sidelink data traffic is transmitted on a third beam.

25. The first wireless communication device of claim 24, wherein the second beam comprises the first beam or the third beam.

26. The first wireless communication device of claim 24, wherein the third beam comprises the first beam or a different beam, the third beam comprising the different beam when a beam capability of at least the first wireless communication device supports multiple simultaneous beams.

27. The first wireless communication device of claim 19, wherein at least one of the first stage SCI or the second stage SCI comprises a beam identifier identifying the second beam when a length of the gap is greater than a threshold, and the gap comprises at least one of the second stage SCI or a demodulation reference signal (DMRS) for the sidelink data traffic.

28. The first wireless communication device of claim 27, wherein:
the second stage SCI comprises the beam identifier,
the threshold corresponds to an extended gap length longer than an original gap length utilized for the threshold when the first stage SCI comprises the beam identifier, and
the threshold is configured based on a capability of the second wireless communication device.

29. The first wireless communication device of claim 19, wherein the processor is further configured to:
communicate feedback information corresponding to the sidelink data traffic with the second wireless communication device on a fourth beam, wherein at least one of the first stage SCI or the second stage SCI comprises a beam identifier identifying the fourth beam when a length of an additional gap between a last one of the first stage SCI or the second stage SCI carrying the beam identifier is greater than a threshold, wherein the fourth beam comprises a default beam when the length of the additional gap between a last one of the first stage SCI or the second stage SCI carrying the beam identifier is less than or equal to the threshold.

30. A first wireless communication device, comprising:
means for communicating first stage sidelink control information (SCI) with a second wireless communication device on a first beam within a control region of a slot;
means for communicating second stage SCI with the second wireless communication device on the first beam within a data region of the slot; and
means for communicating sidelink data traffic with the second wireless communication device on a second beam within the data region of the slot, wherein the second beam is based on a gap between the sidelink data traffic and at least one of the first stage SCI or the second stage SCI.

* * * * *